(12) United States Patent
Kang et al.

(10) Patent No.: US 11,022,110 B2
(45) Date of Patent: Jun. 1, 2021

(54) PUMP CONTROL SYSTEM AND ABNORMAL PROCESSING AND RECOVERING METHOD THEREOF

(71) Applicant: DARTPOINT TECH. CO., LTD., Taipei (TW)

(72) Inventors: Chi-Lin Kang, New Taipei (TW); Chao-Yuan Huang, Taipei (TW)

(73) Assignee: Dartpoint Tech. Co., Ltd., Taipei (TW)

( * ) Notice: Subject to any disclaimer, the term of this patent is extended or adjusted under 35 U.S.C. 154(b) by 210 days.

(21) Appl. No.: 16/386,306

(22) Filed: Apr. 17, 2019

(65) Prior Publication Data
US 2019/0316580 A1    Oct. 17, 2019

(30) Foreign Application Priority Data
Apr. 17, 2018   (TW) .................................. 107113079

(51) Int. Cl.
| H02P 31/00 | (2006.01) |
| F04B 49/06 | (2006.01) |
| F04B 17/03 | (2006.01) |
| F04B 49/20 | (2006.01) |
| H02P 29/024 | (2016.01) |
| H02P 29/028 | (2016.01) |
| H02P 29/60 | (2016.01) |
| H02P 29/68 | (2016.01) |

(52) U.S. Cl.
CPC .............. *F04B 49/06* (2013.01); *F04B 17/03* (2013.01); *F04B 49/20* (2013.01); *H02P 29/024* (2013.01); *H02P 29/027* (2013.01); *H02P 29/028* (2013.01); *H02P 29/60* (2016.02); *H02P 29/68* (2016.02); *H02P 31/00* (2013.01); *F04B 49/065* (2013.01); *H02P 2205/01* (2013.01)

(58) Field of Classification Search
USPC ......................................................... 318/560
See application file for complete search history.

(56) References Cited

U.S. PATENT DOCUMENTS

| 4,229,998 | A | * | 10/1980 | Mizuno | ................. | B60W 10/06 |
| | | | | | | 477/68 |
| 6,167,965 | B1 | * | 1/2001 | Bearden | ................ | E21B 43/385 |
| | | | | | | 166/250.15 |
| 6,599,095 | B1 | | 7/2003 | Yaskawa | | |

(Continued)

FOREIGN PATENT DOCUMENTS

| CN | 101169114 A | 4/2008 |
| CN | 101203678 A | 6/2008 |

(Continued)

*Primary Examiner* — Bentsu Ro
(74) *Attorney, Agent, or Firm* — Mark M. Friedman

(57) ABSTRACT

A pump control system and an abnormal processing and recovering method thereof are disclosed. The pump control system includes a pump; a motor mechanically connected to the pump; and a driving controller electrically coupled to the motor, and the driving controller configured to control a speed of the motor. The driving controller controls the speed of the motor to be varied in a multistage manner in response to an abnormal triggering event, so as to recover the pump control system to an originally set stable state. The abnormal triggering event is generated by at least one physical parameter when the pump control system is operated.

18 Claims, 17 Drawing Sheets

(56) References Cited

U.S. PATENT DOCUMENTS

| | | | |
|---|---|---|---|
| 8,106,615 B2 | 1/2012 | Yaskawa | |
| 2010/0034665 A1 | 2/2010 | Zhong | |
| 2011/0241888 A1 | 10/2011 | Lu et al. | |
| 2016/0084069 A1* | 3/2016 | Camacho Cardenas | ................... F04D 29/528 415/118 |
| 2019/0316579 A1* | 10/2019 | Kang | ................. F04D 15/00 |

FOREIGN PATENT DOCUMENTS

| | | |
|---|---|---|
| CN | 100432871 C | 11/2008 |
| CN | 104980067 A | 10/2015 |
| TW | 201137239 A | 11/2011 |
| TW | I353714 B | 12/2011 |
| TW | M472365 U | 2/2014 |

\* cited by examiner

A PREVIOUS PROCESS OF THE MOTOR DRIVING CONTROLLER

A PREVIOUS PROCESS OF THE MAIN CONTROLLER

S200 → S202 —NO→ 
S202 —YES→ S204 —YES→ 
S204 —NO→ S206 → S208
S206 → S210 → S212
S210 → (merge)
S214 —NO→ S218 → S220 → (merge)
S214 —YES→ S224
S216 → S218
S216 → S222 → S224
S224 → S226

A NEXT PROCESS OF THE MOTOR DRIVING CONTROLLER

A NEXT PROCESS OF THE MAIN CONTROLLER

FIG. 4

PUMP CONTROL SYSTEM AND ABNORMAL PROCESSING AND RECOVERING METHOD THEREOF

BACKGROUND

Field

The present disclosure relates to a pump control field, and more particularly to a pump control system and an abnormal processing and recovering method thereof.

Background

Currently, when a pump control system is used for a long time, characteristics of the pump control system vary. For example, a motor is aging or scale is generated within water pipes. In general, a controller determines its operating state by comparing with preset values. The pump control system does not have any problem(s) after being used in a period of time. However, when the characteristics of the pump control system vary, the various operating states cannot be determined correctly if the initial value or values are still used.

When the pump control system is operated, temporary and unstable changes occur occasionally because water is flowing. As such, temporary and unstable changes of detecting values of the pump control system occur occasionally and correspondingly. In the prior art, the determination is performed using a directly measured value or values. A wrong determination occurs due to the temporary and unstable changes.

When the pump control system performs a water pumping operation, an operating current starts from zero. However, a conventional current detecting circuit has a low sensitivity and thus cannot measure an operating current near zero. As a result, a water pumping state cannot be determined accurately. For example, it cannot determine that a pump and a motor separate from each other or there is no water in the pump.

Furthermore, when an abnormal event occurs in the pump control system, a protecting mechanism is to directly turn off the pump control system or to decrease a speed of the motor and then turn off the pump control system. The pump control system does not have a mechanism of trying to recover to be operated normally.

Consequently, there is a need to provide a pump control system to solve the above-mentioned problems in the prior art.

SUMMARY OF THE DISCLOSURE

The present disclosure provides a pump control system and an abnormal processing and recovering method thereof capable of solving the problems in the prior art.

The pump control system of the present disclosure has an abnormal processing function. The pump control system comprises a pump; a motor mechanically connected to the pump; and a driving controller electrically coupled to the motor, and the driving controller configured to control a speed of the motor. The driving controller is configured to control the speed of the motor to be changed in a multistage manner in response to an abnormal triggering event, so as to recover the pump control system to an originally set stable state. The abnormal triggering event is generated by at least one physical parameter when the pump control system is operated.

In the abnormal processing and recovering method of the pump control system, the pump control system comprises a pump, a motor mechanically connected to the pump, and a driving controller electrically coupled to the motor. The abnormal processing and recovering method of the pump control system comprises: driving the pump to operate by the motor; and controlling, by the driving controller, a speed of the motor to be changed in a multistage manner in response to an abnormal triggering event, so as to recover the pump control system to an originally set stable state. The abnormal triggering event is generated by at least one physical parameter when the pump control system is operated.

In the pump control system and the abnormal processing and recovering method thereof of the present disclosure, when an abnormal event occurs, the pump control system can try to recover to be operated normally.

BRIEF DESCRIPTION OF THE DRAWINGS

FIG. 4 illustrates a flowchart of setting the pump control system before leaving factory and a learning mode in accordance with an embodiment of the present disclosure.

DETAILED DESCRIPTION OF THE PREFERRED EMBODIMENTS

Figure 1:
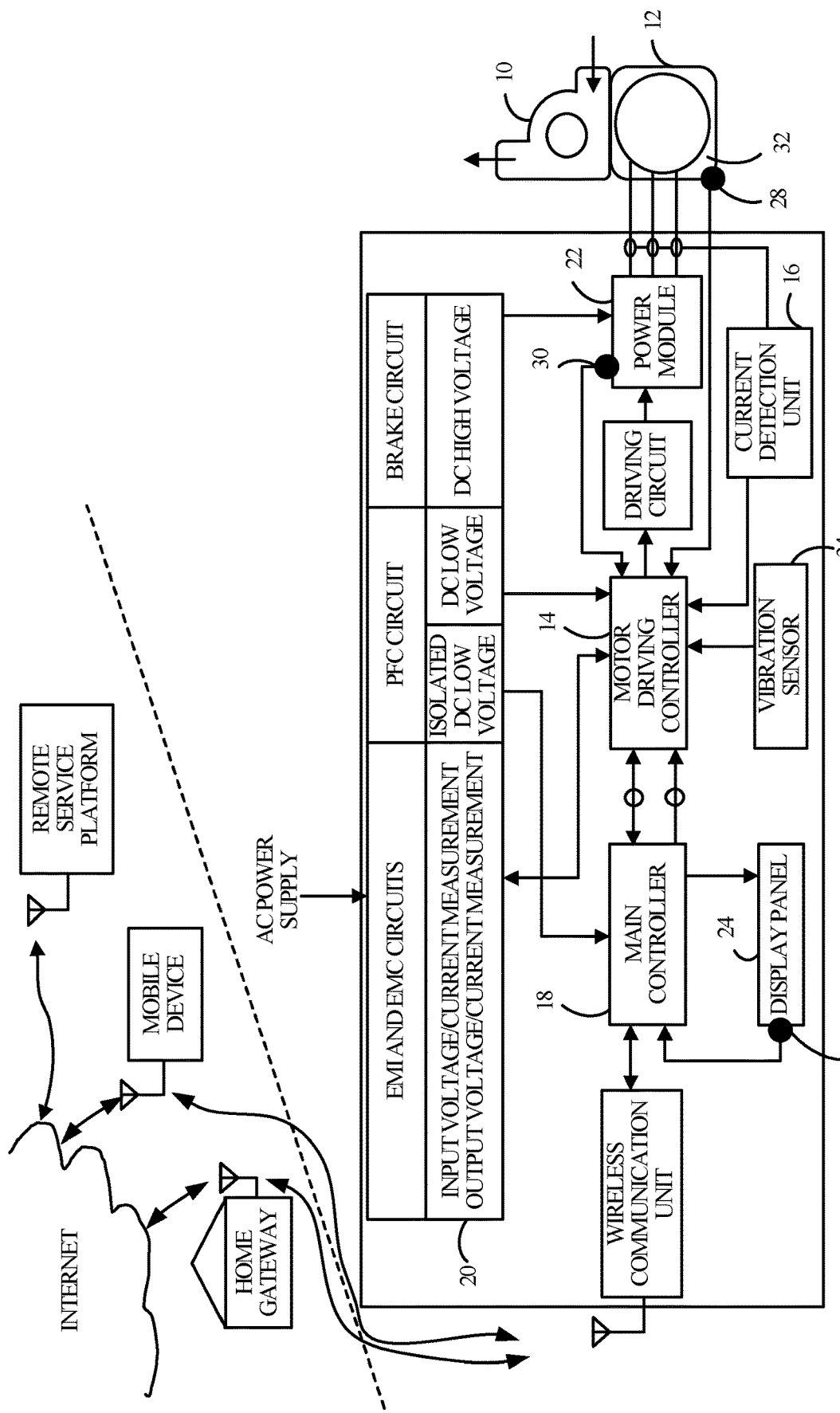
FIG. 1 illustrates a pump control system in accordance with an embodiment of the present disclosure.

Please refer to FIG. 1. FIG. 1 illustrates a pump control system in accordance with an embodiment of the present disclosure. The pump control system is configured to control a water supply system, for example but not limited to a swimming pool.

The pump control system comprises a pump 10, a motor 12, a motor driving controller 14, a current detection unit 16 and a main controller 18.

The motor 12 is mechanically connected to the pump 10.

The motor driving controller 14 is electrically coupled to the motor 12. The motor driving controller 14 is configured to control a speed of the motor 12. The motor driving controller 14 is further configured to detect the speed of the motor 12.

In the present embodiment, the current detection unit 16 is electrically coupled between the motor 12 and the motor driving controller 14. In another embodiment, the current detection unit 16 is electrically coupled to a power supply input interface 20 of the pump control system. The power supply input interface 20 has an EMI circuit and an EMC circuit. The EMI circuit and the EMC circuit are configured to isolate an alternating current (AC) power supply, so that high frequency noises from the alternating current power supply do not affect the pump control system.

The power supply input interface 20 further has a power factor correction (PFC) circuit capable of improving a power factor of the motor 12. Because the active PFC circuit is used, an operating voltage of the motor 12 is fixed. When a voltage is applied to the motor 12, a current is correspondingly generated and the corresponding current also corresponds to a speed of the motor 12. Accordingly, the amount of water flow can be estimated according to the corresponding current. That is, when the current is decreased, the amount of water flow is decreased. When the current is increased, the amount of water flow is increased. A feature of the pump control system of the present disclosure is that a current value of the motor 12 is accurately detected by the current detection unit 16, thereby estimating the amount of water flow via the current value.

The main controller 18 is electrically coupled to the motor driving controller 14. In detail, the main controller 18 and the motor driving controller 14 adopt an electrical communication channel sending signals by a photocoupler and isolating electrical signals, and the main controller 18 is provided with power from a direct current low power supply which is isolated, so as to isolate noises from the operation of the motor 12 and the noises from the alternating current power supply. As such, the main controller 18 which performs a calculating function and a determining mechanism is not affected by the noises from the motor 12 and the alternating current power supply. The main controller 18 can reset the motor driving controller 14.

When the motor 12 drives the pump 10 to operate, the current detection unit 16 detects a current value of the motor 12 at a present time point. In one embodiment, at least one of the motor driving controller 14 and the main controller 18 calculates an average value of the current value at the present time point and at least one current value at at least one time point prior to the present time point. In the following calculations, at least one of the motor driving controller 14 and the main controller 18 calculates an average value of the current value at the present time point and at least one average value (i.e., current average value) at the at least one time point prior to the present time point. The average values are shifting average values.

At least one of the motor driving controller 14 and the main controller 18 performs the calculations of the above shifting average values every first predetermined time interval, and the calculations last for one second predetermined time interval to acquire a dynamic and shifting multiple average value. At least one of the motor driving controller 14 and the main controller 18 determines a priming condition or a water loss condition of the pump control system according to the dynamic and shifting multiple average value. The second predetermined time interval is longer than the first predetermined time interval. The dynamic and shifting multiple average value may be regarded as a dynamic and floating reference value.

For example, the first predetermined time interval is 0.125 seconds, and the second predetermined time interval is 1 second. In the pump control system of the present disclosure, the calculations of the above average values are performed every 0.125 seconds. That is, an average value (hereinafter referred to as "shifting average value") of at least one current value (or at least one current average value) at at least one time point prior to the present time point and the current value at the present time point is acquired every 0.125 seconds, and calculating the above average values lasts for one second to acquire a dynamic and shifting multiple average value.

An average value of a current value at a present time point and three current average values at three time points prior to the present time point can be calculated by the following formula:

$$Y(n)=[X(n)+Y(n-1)+Y(n-2)+Y(n-3)].$$

X represents the current value at the present time point, Y represents the average value acquired according to the above formula, and n represents the present time point.

Furthermore, the average value can be further processed by the least squares method, thereby smoothing changes of the average values.

In detail, the dynamic and shifting multiple average value is an average value of a value at a present time point and at least one value at at least one time point prior to the present time point. The present time point and the at least one time point prior to the present time point are continuous time points, and the present time point is shifted from the at least one time point prior to the present time point with a predetermined time interval. The predetermined time interval is a time interval between the present time point and the at least one time point prior to the present time point. When the predetermined time interval is 1 second, the dynamic and shifting multiple average value is acquired every second. When the predetermined time interval is 1 minute, the dynamic and shifting multiple average value is acquired every minute. When the predetermined time interval is 1 hour, the dynamic and shifting multiple average value is acquired every hour. When the predetermined time interval is 1 day, the dynamic and shifting multiple average value is acquired every day. When the predetermined time interval is 1 month, the dynamic and shifting multiple average value is acquired every month. When the predetermined time interval is 1 season, the dynamic and shifting multiple average value is acquired every season. When the predetermined time interval is 1 year, the dynamic and shifting multiple average value is acquired every year. Each time point can have plural dynamic and shifting multiple average values of different predetermined time intervals, and it is required to choose, according to different machines, different devices or different operating conditions, one of the dynamic and shifting multiple average values of different time intervals as a determination reference.

Furthermore, the pump control system of the present disclosure can store at least one of the dynamic and shifting multiple average values of every day, every month, every season, and every year. The dynamic and shifting multiple average values of every second, every minute and every hour are not stored, so that required data memory capacity can be decreased significantly.

At least one of the motor driving controller 14 and the main controller 18 can accurately determine the priming condition or the water loss condition according to the above dynamic and shifting multiple average values.

Each of the dynamic and shifting multiple average values is acquired, according to continuous detections and calculations in a predetermined time interval at each time point in a practical operation. The dynamic and shifting multiple average values have different values in response to the use time, the aging of machines or the changes of devices. The dynamic and shifting multiple average values are served as reference values or upper limit values of at least one of the motor driving controller 14 and the main controller 18.

A conventional pump control system uses predetermined parameters to monitor a priming condition or a water loss condition. A feature of the pump control system of the present disclosure is to use a dynamic and floating monitoring mechanism. In detail, the pump control system of the present disclosure uses dynamic parameters (the dynamic and shifting multiple average values) to determine the priming condition or the water loss condition. Accordingly, the pump control system of the present disclosure is capable of adaptively controlling a water supply system.

A process of determining a priming condition by the pump control system of the present disclosure is described as follows. In a detecting period, at least one new detecting period is added in response to the shifting average value not reaching a threshold value corresponding to the detecting period. When a number of adding the at least one new detecting period reaches a predetermined number and the shifting average value does not reach the threshold value corresponding to the detecting period, at least one of the motor driving controller 14 and the main controller 18 controls the motor 12 to stop operating.

In one embodiment, when an accumulated time of adding the at least one new detecting period is longer than a predetermined time threshold value, the motor 12 stops operating.

In another embodiment, a period of detecting an upper limit of the shifting average value is further included. In the period, when the shifting average value is greater than a predetermined upper limit threshold value of the shifting average value, the motor 12 stops operating.

Furthermore, the pump control system of the present disclosure further comprises a display panel 24. The display panel 24 is configured to display a priming condition. The priming condition comprises a priming time and/or a target percentage of the amount of water at present or before the motor 12 stops operating.

A process of determining a water loss condition by the pump control system of the present disclosure is described as follows. When a decreased portion of the shifting average value is greater than a first predetermined ratio of the dynamic and shifting multiple average value, a tracking mode is entered to track the amount of water loss. When an accumulated decreased portion of the shifting average value is greater than a second predetermined ratio of the dynamic and shifting multiple average value or the accumulated decreased portion of the shifting average value is greater than a fourth predetermined ratio of the dynamic and shifting multiple average value and time is longer than a second time duration, the motor 12 stops operating.

In one embodiment, the tracking mode comprises: starting a time duration timer and an integrator of the amount of water loss; adding the decreased portion of the shifting average value at that time to the integrator of the amount of water loss, and adding a first time duration to the time duration timer; determining whether the accumulated decreased portion of the shifting average value at that time is smaller than or equal to the fourth predetermined ratio of the dynamic and shifting multiple average value and the time duration timer is shorter than or equal to the second time duration; determining whether the accumulated decreased portion of the shifting average value at that time is smaller than or equal to the second predetermined ratio of the dynamic and shifting multiple average value; subtracting a third predetermined ratio of the dynamic and shifting multiple average value from the integrator of the amount of water loss when it is determined that the time duration timer at that time is equal to a third time duration or a multiple of the third time duration, wherein the second time duration is longer than the first time duration; setting the time duration timer and the integrator of the amount of water loss to zero when the integrator of the amount of water loss has a negative value; adding the first time duration to the time duration timer when the integrator of the amount of water loss does not have a negative value and the shifting average value is smaller than or equal to the first predetermined ratio of the dynamic and shifting multiple average value; and returning to the step of determining whether the time duration timer is equal to the third time duration or the multiple of the third time duration.

Furthermore, the display panel 24 is further configured to display a water loss condition. The water loss condition comprises a record of a recovering operation and/or the amount of water loss at present or before the motor 12 stops operating.

An initial value of the dynamic and shifting multiple average value is a value which is acquired when the pump control system is operated normally before leaving factory or when the pump control system is installed on site and operated normally.

Furthermore, the pump control system of the present disclosure can perform different control modes according to the shifting average values. In one embodiment, at least one of the motor driving controller 14 and the main controller 18 controls, in response to the shifting average values, the motor 12 to keep on operating or stop operating.

In another embodiment, when a positive or negative slope of the shifting average values of the motor 12 in a period is within a range, at least one of the motor driving controller 14 and the main controller 18 controls the motor 12 to keep on operating.

In yet another embodiment, when the positive or negative slope of the shifting average values of the motor 12 in the period is not within the range, at least one of the motor driving controller 14 and the main controller 18 controls the motor 12 to stop operating.

In yet another embodiment, when a positive or negative slope of a plurality of the shifting average values of the motor 12 in a period is out of a range, at least one of the motor driving controller 14 and the main controller 18 predicts the motor 12 to be abnormal and controls the motor 12 to stop operating.

Figure 2:
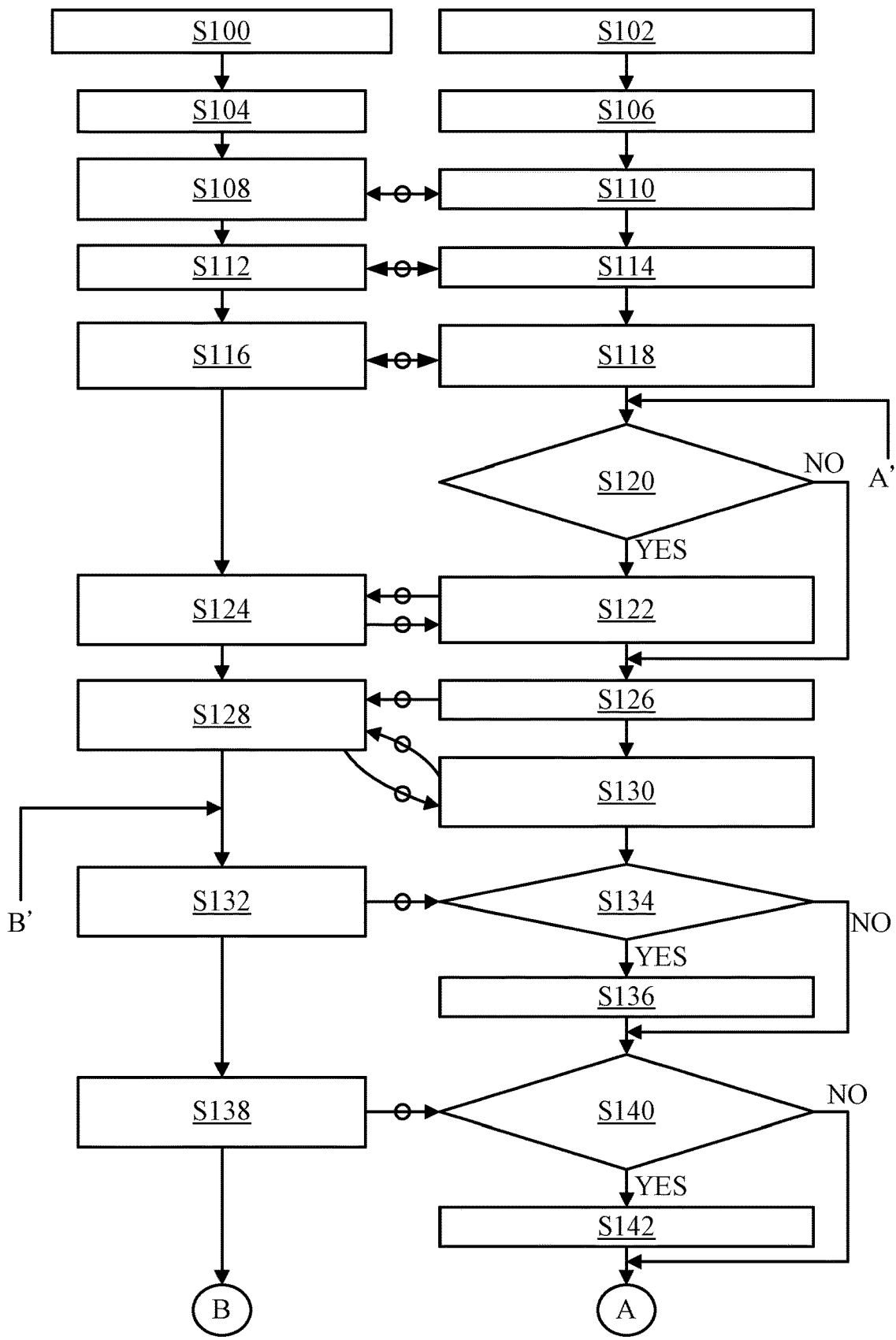
FIG. 2 and FIG. 3 illustrate a flowchart after starting up the pump control system in accordance with an embodiment of the present disclosure.
Figure 3:
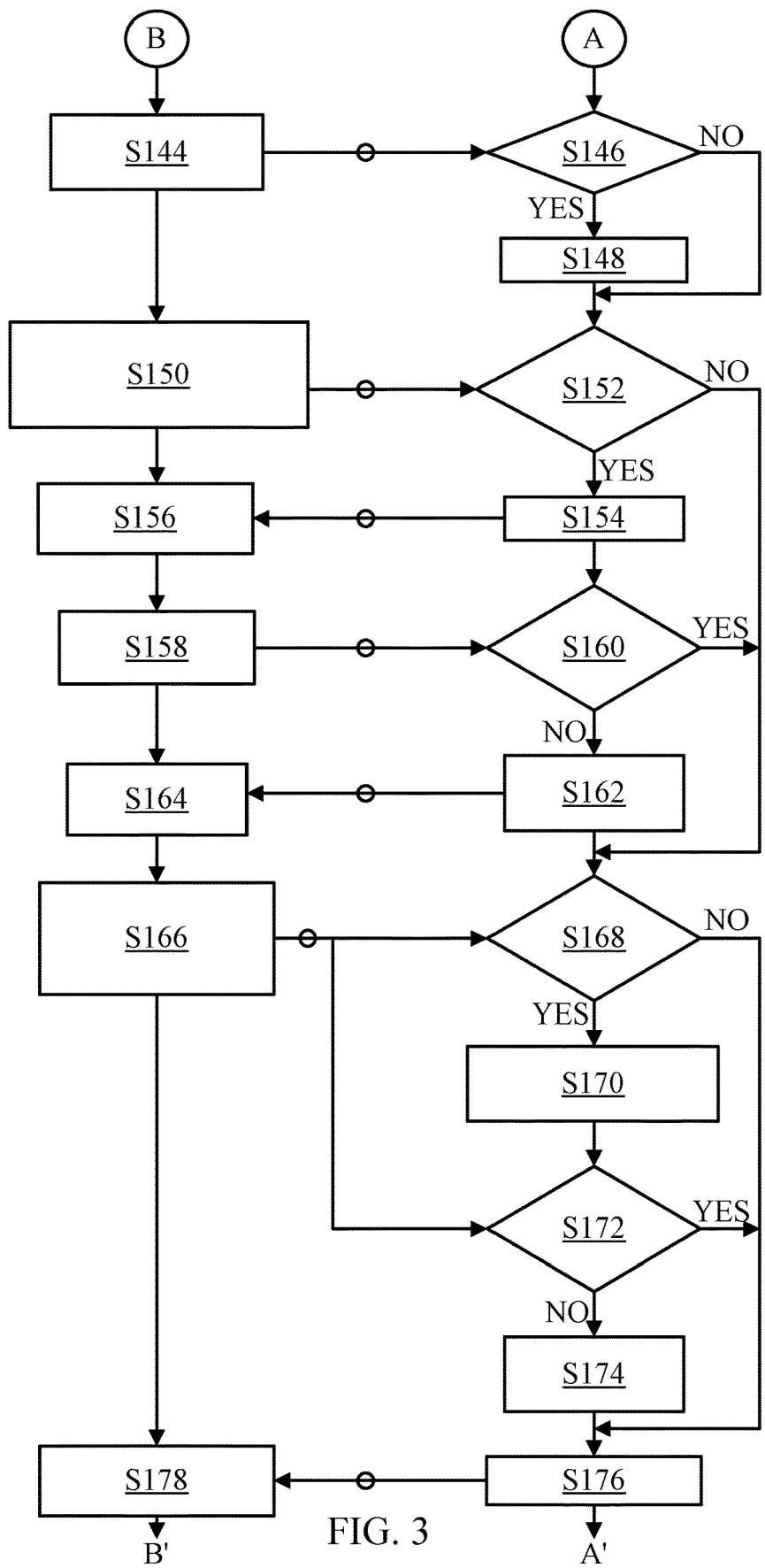

Please refer to FIG. 1 to FIG. 3. FIG. 2 and FIG. 3 illustrate a flowchart after starting up the pump control system in accordance with an embodiment of the present disclosure.

In step S100, the motor driving controller 14 is started up and initialized. Step S104 is performed.

In step S102, the main controller 18 is started up and initialized. Step S106 is performed.

In step S104, a power module 22 is set to be turned off. Step S108 is performed.

In step S106, the main controller 18 performs a self-test operation and is in a ready state. Step S110 is performed.

In step S108, the system performs a self-test operation and establishes a communication channel with the main controller 18. Step S112 is performed.

In step S110, the system establishes a communication channel with the motor driving controller 14. Step S114 is performed.

In step S112, the motor driving controller 14 detects a current value via the current detection unit 16. Step S116 is performed.

In step S114, the system is set before leaving factory and a learning mode program is performed. Step S118 is performed.

In step S116, the motor driving controller 14 performs a process of establishing dynamic and shifting multiple average values in a short time. Step S124 is performed.

In step S118, the main controller 18 performs a process of establishing dynamic and shifting multiple average values in a long time. Step S120 is performed.

In step S120, it is determined whether to start up the pump 10. If yes, step S122 is performed. If no, step S126 is performed.

In step S122, starting up the motor 12 is performed, a current and a temperature are read, and a priming process is performed. Step S126 is performed.

In step S124, the motor 12 is started up, and the current and the temperature are measured. Step S128 is performed.

In step S126, other functions are performed, and a predetermined speed is started up. Step S130 is performed.

In step S128, a speed of the motor 12 is set, and the speed, the current and the temperature are measured. Step S132 is performed.

In step S130, a process of tracking a safety vacuum release system (SVRS) is performed by the dynamic and shifting multiple average values in the short time. Step S134 is performed.

In step S132, a state of stall speed of the motor 12 is detected. Step S138 is performed.

In step S134, it is determined whether the stall speed of the motor 12 occurs. If yes, step S136 is performed. If no, step S140 is performed.

In step S136, a process of protecting the stall speed of the motor 12 is performed. Step S140 is performed.

In step S138, a state of the motor 12 is detected, and the current and the temperature are measured. Step S144 is performed.

In step S140, it is determined whether the temperature is abnormal. If yes, step S142 is performed. If no, step S146 is performed.

In step S142, a protecting process of balancing the temperature/speed is performed. Step S146 is performed.

In step S144, a state of underspeed of the motor 12 is detected. Step S150 is performed.

In step S146, it is determined whether the underspeed of the motor 12 occurs. If yes, step S148 is performed. If no, step S152 is performed.

In step S148, a process of protecting the underspeed of the motor 12 is performed. Step S152 is performed.

In step S150, the motor driving controller 14 crashes, and a watchdog timer of the motor driving controller 14 has a fault. Step S156 is performed.

In step S152, the main controller 18 determines whether the motor driving controller 14 crashes. If yes, step S154 is performed. If no, step S168 is performed.

In step S154, a recovering mechanism is started up. Step S160 is performed.

In step S156, the motor driving controller 14 starts up the recovering mechanism. Step S158 is performed.

In step S158, a communication function and an electrical measurement function are recovered. Step S164 is performed.

In step S160, it is determined whether the communication function is normal. If yes, step S168 is performed. If no, step S162 is performed.

In step S162, the display panel 24 is set and the pump 10 is stopped. Step S168 is performed.

In step S164, the operations of the power module 22 is stopped. Step S166 is performed.

In step S166, a protecting state (including an overvoltage state, an overcurrent state and an overtemperature state) of the motor 12 is detected. Step S178 is performed.

In step S168, it is determined whether the overvoltage state occurs. If yes, step S170 is performed. If no, step S176 is performed.

In step S170, the power module 22 is controlled to stop outputting, so that the motor 12 is paused for M seconds (e.g., 10 seconds). Step S172 is performed.

In step S172, it is determined whether the voltage normally lasts for N seconds (e.g., 4 seconds). If yes, step S176 is performed. If no, step S174 is performed.

In step S174, the motor 12 stops and the state of the motor 12 is shown on the display panel 24. Step S176 is performed.

In step S176, a control command is received. Step S120 is returned to.

In step S178, the motor driving controller 14 performs the control command. Step S132 is returned to.

It is noted that a symbol "○" between two steps represents a communication channel, for example, between step S108 and step S110.

Please refer to FIG. 1 and FIG. 4. FIG. 4 illustrates a flowchart of setting the pump control system before leaving factory and a learning mode in accordance with an embodiment of the present disclosure.

In step S200, the main controller 18 reads a control command. Step S202 is performed.

In step S202, it is determined whether to enter the learning mode. If yes, step S204 is performed. If no, a next process of the main controller 18 is performed.

In step S204, it is determined whether the pump 10 is operating. If yes, step S214 is performed. If no, step S206 is performed.

In step S206, the pump 10 is started up, and the learning mode is entered. Step S210 is performed.

In step S208, the motor is started up. Step S212 is performed.

In step S210, a priming speed mode is entered. Step S214 is performed.

In step S212, the motor driving controller 14 controls the priming speed. Step S216 is performed.

In step S214, it is determined whether a priming time is longer than a predetermined time duration (e.g., 30 minutes). If yes, step S224 is performed. If no, step S218 is performed.

In step S216, a current value of the motor 12 is measured. Step S222 is performed.

In step S218, the dynamic and shifting multiple average values in a short time are calculated. Step S220 is performed.

In step S220, the dynamic and shifting multiple average values in the short time are stored. Step S214 is performed.

In step S222, a current value of the motor 12 is measured.

In step S224, the current value at the priming speed is stored. Step S226 is performed.

In step S226, the learning mode exits.

It is noted that a symbol "o" between two steps represents a communication channel, for example, between step S206 and step S208.

Figure 5:
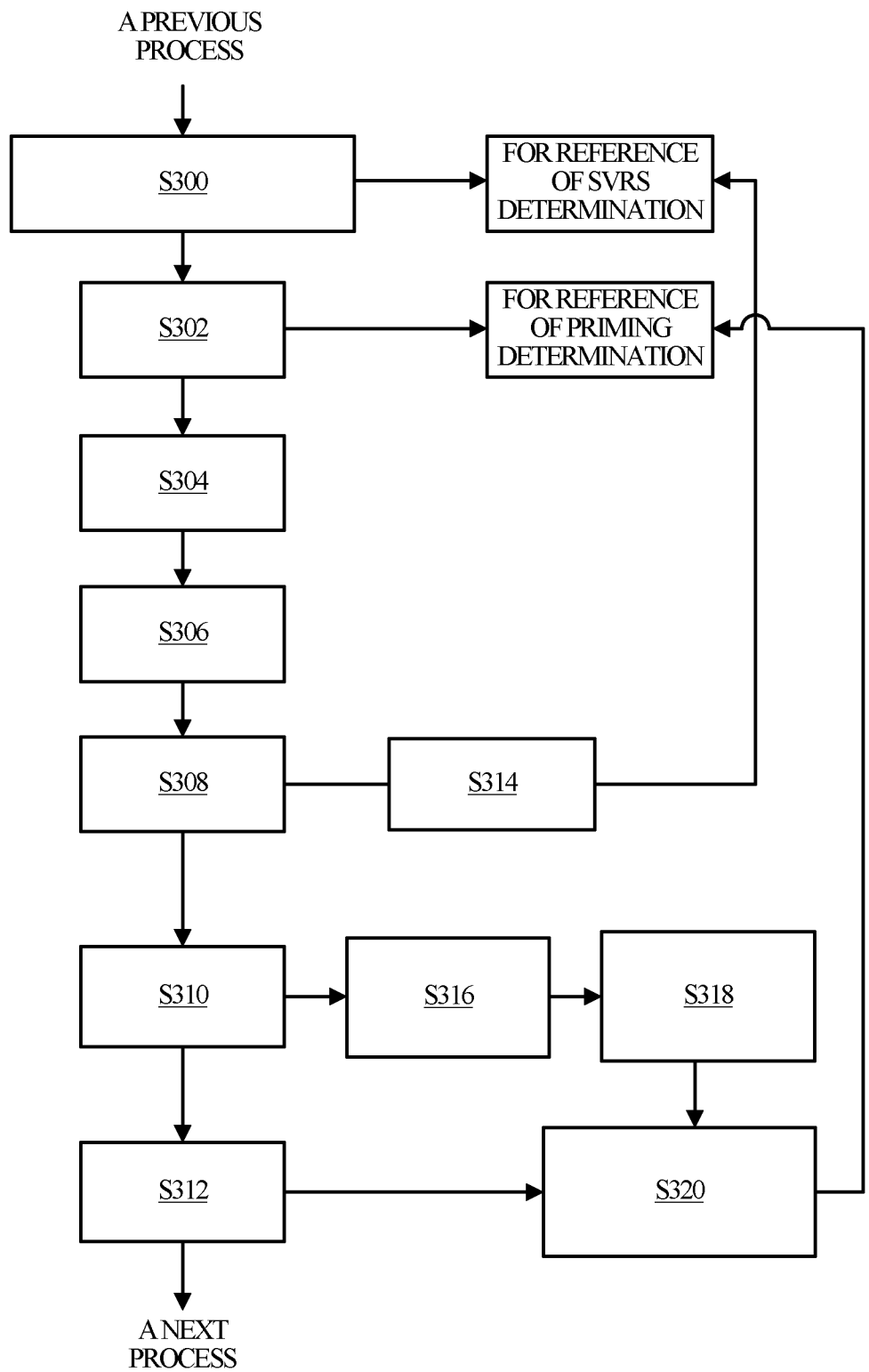
FIG. 5 illustrates a flowchart of establishing the dynamic and shifting multiple average values by the pump control system in accordance with an embodiment of the present disclosure.

Please refer to FIG. 1 and FIG. 5. FIG. 5 illustrates a flowchart of establishing the dynamic and shifting multiple average values by the pump control system in accordance with an embodiment of the present disclosure.

In step S300, the shifting average values of every first predetermined time interval (e.g. 0.125 seconds) are acquired.

In step S302, the dynamic and shifting multiple average values of every second (the second predetermined time interval) are acquired.

In step S304, the dynamic and shifting multiple average values of every minute are acquired.

In step S306, the dynamic and shifting multiple average values of every hour are acquired.

In step S308, the dynamic and shifting multiple average values of every day are acquired.

In step S310, the dynamic and shifting multiple average values of every month are acquired.

In step S312, the dynamic and shifting multiple average values of every season are acquired.

The above steps S300-S308 may be regarded as a process of establishing the dynamic and shifting multiple average values of the motor driving controller 14 in a short time. The above steps S310-S312 may be regarded as a process of establishing the dynamic and shifting multiple average values of the main controller 18 in a long time.

In one embodiment, the flowchart further comprises step S314 of storing the dynamic and shifting multiple average values of SVRS.

When a state of water loss occurs (for example, when a water outlet jams due to a human or something), the function of the SVRS is implemented by activating a protecting mechanism to turn off the pump 10.

In one embodiment, the flowchart further comprises step S316 of storing the dynamic and shifting multiple average values corresponding to plural speeds.

In one embodiment, the flowchart further comprises step S318 of storing the dynamic and shifting multiple average values of each month for reference of a priming operation.

In one embodiment, the flowchart further comprises step S320 of storing the dynamic and shifting multiple average values of each season.

Figure 6:
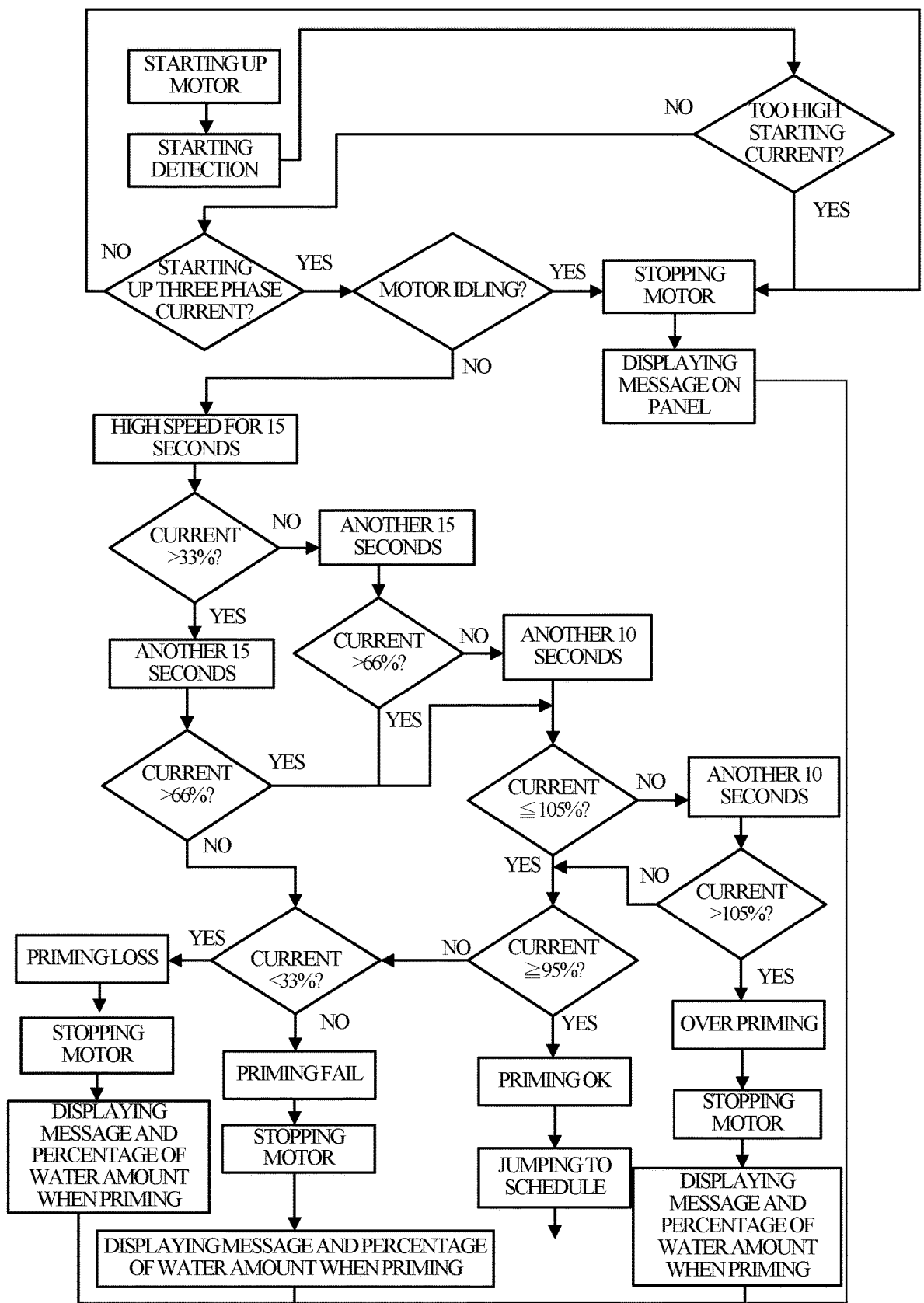
FIG. 6 illustrates a flowchart of controlling a priming operation of the pump control system in accordance with an embodiment of the present disclosure.

Please refer to FIG. 1 and FIG. 6. FIG. 6 illustrates a flowchart of controlling a priming operation of the pump control system in accordance with an embodiment of the present disclosure.

Figure 7:
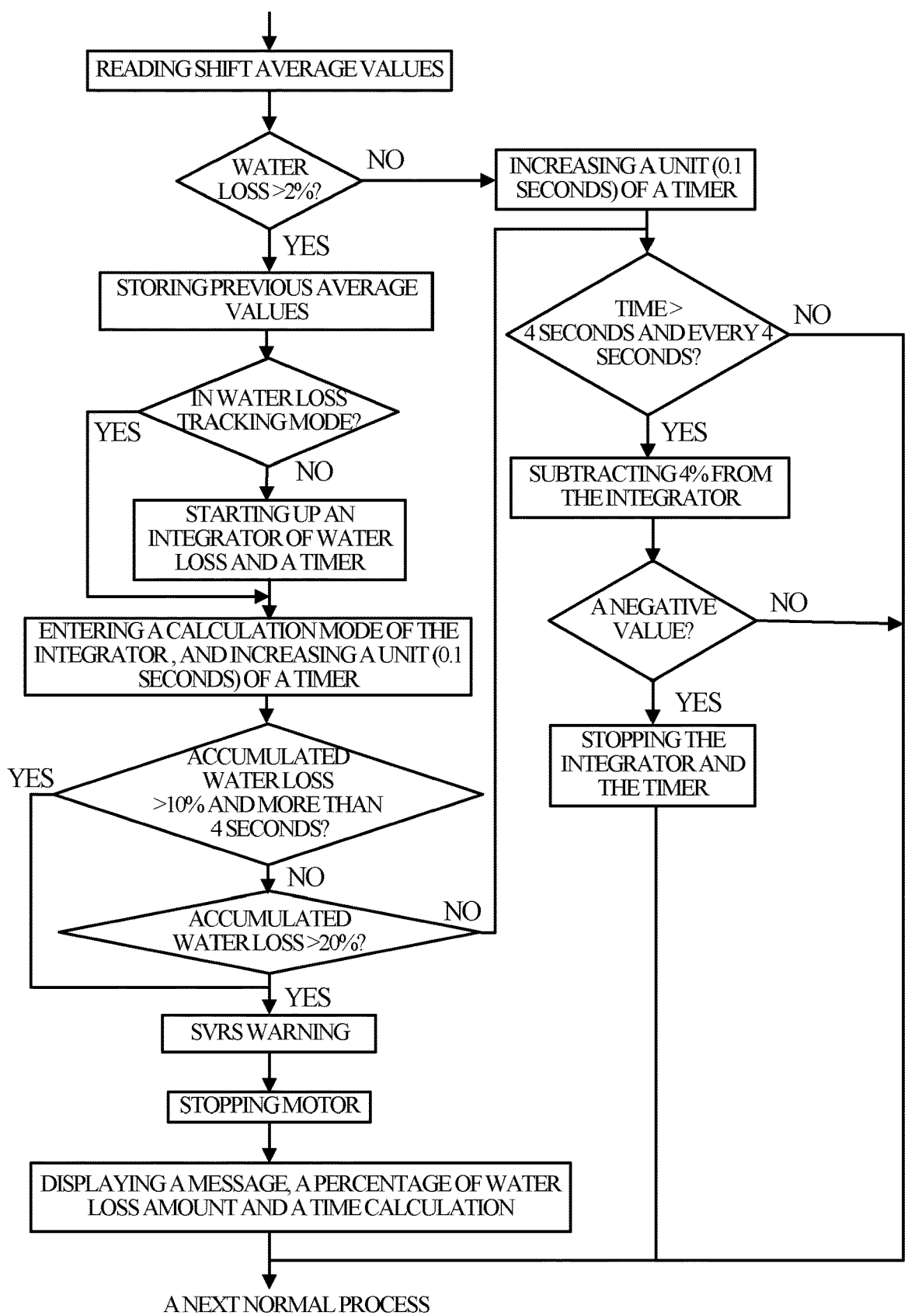
FIG. 7 illustrates a flowchart of monitoring a state of water loss of the pump control system in accordance with an embodiment of the present disclosure.

Please refer to FIG. 1 and FIG. 7. FIG. 7 illustrates a flowchart of monitoring a state of water loss of the pump control system in accordance with an embodiment of the present disclosure.

Figure 8:
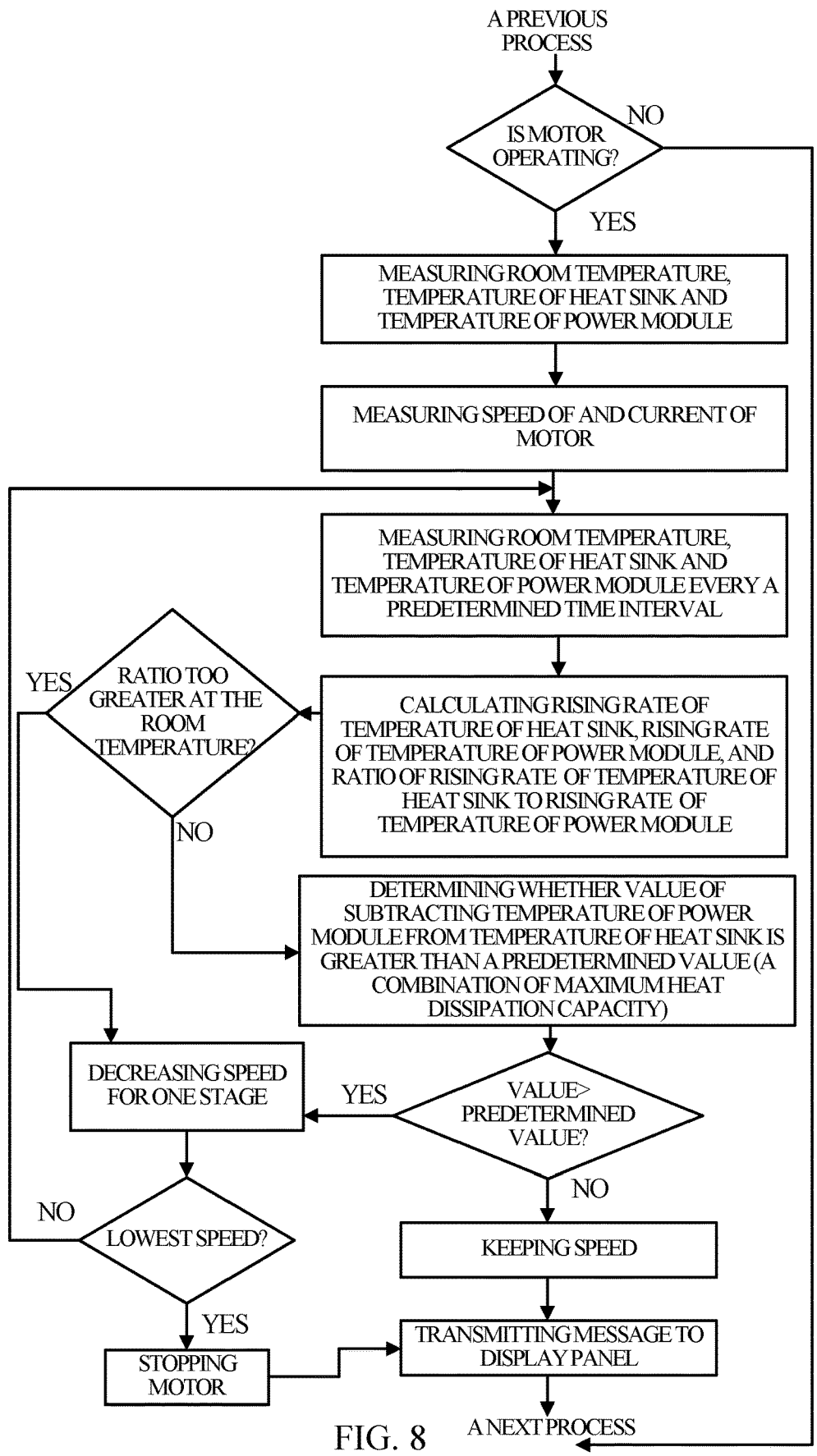
FIG. 8 illustrates a protecting flowchart of balancing a temperature and a speed of the pump control system in accordance with an embodiment of the present disclosure.

Please refer to FIG. 1 and FIG. 8. FIG. 8 illustrates a protecting flowchart of balancing a temperature and a speed of the pump control system in accordance with an embodiment of the present disclosure.

The pump control system of the present disclosure further comprises a first temperature sensor 26, a second temperature sensor 28 and a third temperature sensor 30.

The first temperature sensor 26 is configured to sense an ambient temperature surrounding the main controller 18. The second temperature sensor 28 is configured to sense a temperature of a heat sink 32. The heat sink 32 is disposed in at least one of the motor 12 and the power module 22. The third temperature sensor 30 is configured to sense a temperature of the power module 22 connected to the motor 12.

A protecting mechanism of balancing the temperature and the speed of the pump control system is summarized as follows. In one embodiment, the main controller 18 controls the speed of the motor 12 to be decreased in a multistage manner in response to at least one of the temperature of the second temperature sensor 28 and the temperature of the third temperature sensor 30 greater than a corresponding upper limit value. When the temperature of the second temperature sensor 28 and the temperature of the third temperature sensor 30 are normal, the speed is increased. When at least one of the temperature of the second temperature sensor 28 and the temperature of the third temperature sensor 30 is not normal, the speed of the motor 12 is decreased again. After the speed of the motor 12 is decreased again, the speed of the motor 12 is increased in a multistage manner when the temperature of the second temperature sensor 28 and the temperature of the third temperature sensor 30 are normal. When at least one of the temperature of the second temperature sensor 28 and the temperature of the third temperature sensor 30 is not normal, the speed is decreased again. After the speed of the motor 12 is increased, the speed is increased again when the temperature of the second temperature sensor 28 and the temperature of the third temperature sensor 30 are normal. When at least one of the temperature of the second temperature sensor 28 and the temperature of the third temperature sensor 30 is not normal, the speed is decreased again. The above operations last shorter than a predetermined time, and the main controller 18 controls the motor 12 to be operated at a highest one of speeds that can be operated normally. The speeds that can be operated normally are equal to or lower than an original speed which is set before the above operations. After duration of the above operations reaches the predetermined time and at least one of the temperature of the second temperature sensor 28 and the temperature of the third temperature sensor 30 is not normal, the main controller 18 controls the motor 12 to stop operating. The upper limit values vary with the temperature of the first temperature sensor 26. Because the second temperature sensor 28 and the third temperature sensor 30 are disposed at different locations, the upper limit value corresponding to the second temperature sensor 28 and the upper limit value corresponding to the third temperature sensor 30 are different.

In another embodiment, when at least one of a positive or negative slope of the temperature of the second temperature sensor 28 and a positive or negative slope of the temperature of the third temperature sensor 30 is greater than a corresponding upper limit value, the main controller 18 predicts the motor to be abnormal and controls the speed of the motor 12 to be decreased. The corresponding upper limit value varies with the temperature of the first temperature sensor 26.

Figure 9:
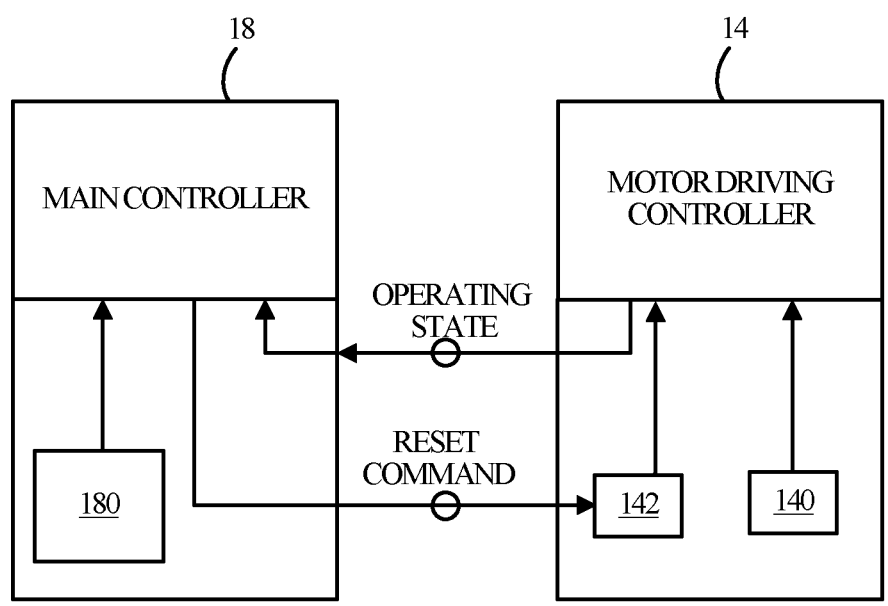
FIG. 9 illustrates a crash protecting mechanism of the motor driving controller and the main controller in accordance with an embodiment of the present disclosure.

Please refer to FIG. 1 and FIG. 9. FIG. 9 illustrates a crash protecting mechanism of the motor driving controller 14 and the main controller 18 in accordance with an embodiment of the present disclosure.

As shown in FIG. 9, the main controller 18 comprises a first watchdog timer 180. When the main controller 18 crashes, the first watchdog timer 180 resets the main controller 18. The motor driving controller 14 comprises a second watchdog timer 140 and a reset circuit 142. When the motor driving controller 14 crashes, the second watchdog timer 140 resets the motor driving controller 14. When the motor driving controller 14 crashes and the second watchdog timer 140 cannot be operated normally, the main controller 18 resets the motor driving controller 14 via the reset circuit 142. That is, the main controller 18 can be regarded as a third watchdog timer of the pump control system of the present disclosure.

Figure 10:
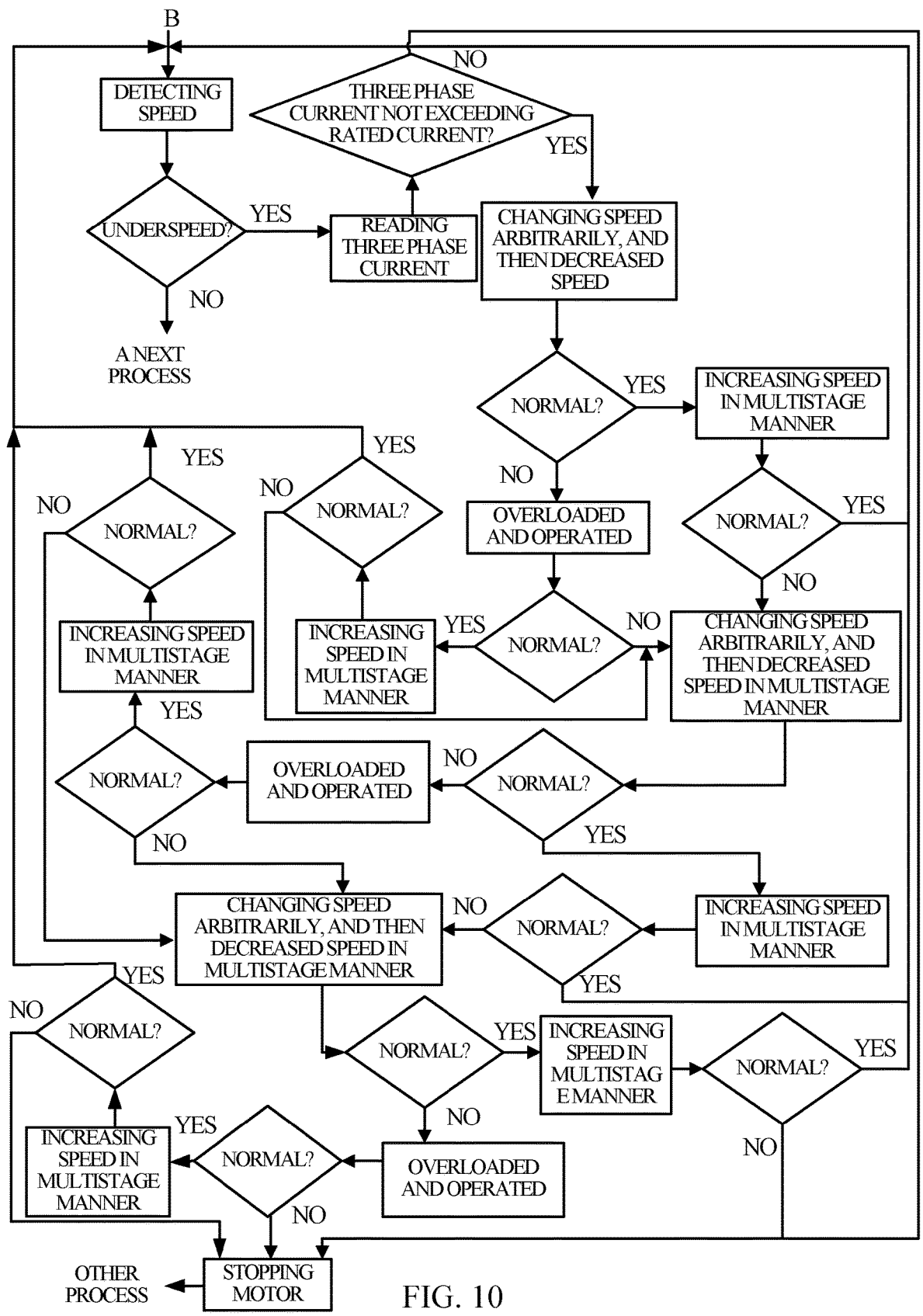
FIG. 10 illustrates a flowchart of a process method in accordance with an embodiment of the present disclosure when a state of underspeed of the motor occurs.

Please refer to FIG. 1 and FIG. 10. FIG. 10 illustrates a flowchart of a process method in accordance with an embodiment of the present disclosure when a state of underspeed of the motor 12 occurs.

The process method is summarized as follows. In response to the shifting average value greater than a current upper limit value and the speed of the motor 12 lower than a speed lower limit value, the motor driving controller 14 controls the speed of the motor 12 to be changed arbitrarily for several times in a period of time first, and then to be set at a speed lower than an originally set speed. When it is determined, according to the shifting average value and the speed, that the motor is still not normal, the motor 12 is controlled to be overloaded and operated for a period of time and then the speed is set at a speed lower than the originally set speed. When the motor is normal, the speed remains for a period of time and then the speed is controlled to be increased in a multistage manner. When it is determined, according to the shifting average value and the speed, that the motor is still not normal after the motor 12 is controlled to be overloaded and operated for the period of time and then the speed is set at a speed lower than the originally set speed, the speed of the motor 12 is controlled to be changed arbitrarily for several times in a period of time first, and then to be set at a speed lower than the originally set speed. When it is determined that the motor is normal, the speed remains for a period of time and then the speed is controlled to be increased in a multistage manner. When the motor driving controller 14 controls the speed of the motor 12 to be increased in a multistage manner but the motor is not normal, the motor driving controller 14 controls the speed of the motor 12 to be changed arbitrarily for several times in a period of time first, and then to be set at a speed lower than the originally set speed. After the motor driving controller 14 controls the speed of the motor 12 to be changed arbitrarily for several times in a period of time first and then to be set at the speed lower than the originally set speed, the motor 12 is controlled to be overloaded and operated for a period of time and then the speed is set at a speed lower than the originally set speed when it is determined, according to the shifting average value and the speed, that the motor 12 is still not normal. When it is determined that the motor is normal, the speed remains for a period of time and then the speed is controlled to be increased in a multistage manner. When it is determined that the motor is still not normal after the motor driving controller 14 controls the speed of the motor 12 to be increased in a multistage manner, the motor 12 is controlled to be overloaded and operated for a period of time and then the speed is set at a speed lower than the originally set speed. The above operations last shorter than a predetermined time, and the motor driving controller 14 controls the motor 12 to be operated at a highest one of speeds that can be operated normally. The speeds that can be operated normally are equal to or lower than an original speed which is set before the above operations. After duration of the above operations reaches the predetermined time and the shifting average value and the speed are not normal, the motor driving controller 14 controls the motor 12 to stop operating. In the above operations, the shifting average value is determined according to the dynamic and shifting multiple average values, and the speed is determined according to the set speed at that time.

After the motor driving controller 14 controls the speed of the motor 12 to be changed arbitrarily for several times or controls the motor 12 to be overloaded and operated, the speed is set at a first speed lower than the originally set speed and it is determined, according to the shifting average value and the speed, whether the motor is normal. When it is determined that the motor is not normal, the speed is set to a second speed lower than the originally set speed after the motor driving controller 14 controls the motor 12 to be overloaded and operated or controls the speed of the motor 12 to be changed arbitrarily for several times in the following steps. The second speed is lower than the first speed.

Figure 11:
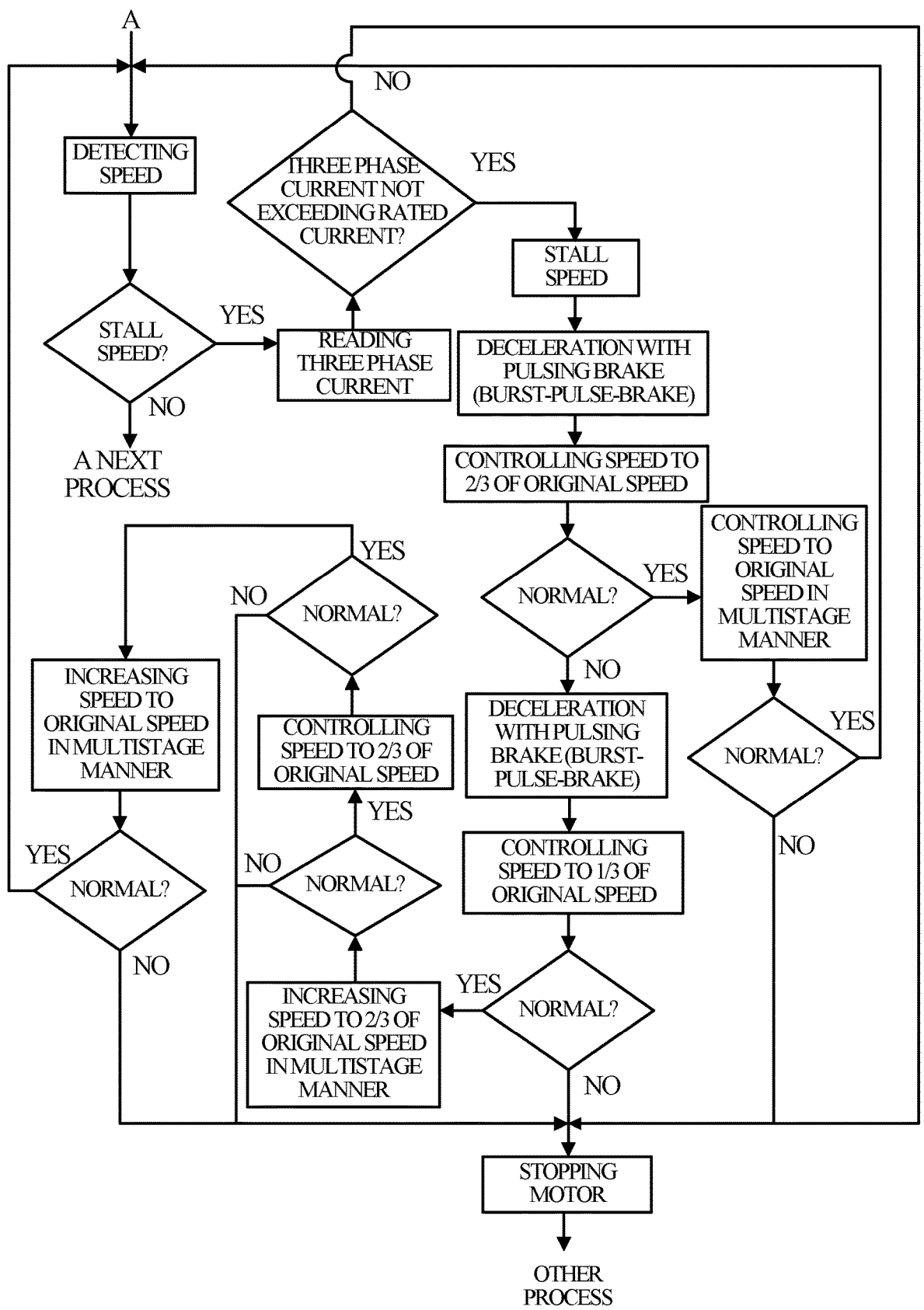
FIG. 11 illustrates a flowchart of a process method in accordance with an embodiment of the present disclosure when a state of stall speed of the motor occurs.

Please refer to FIG. 1 and FIG. 11. FIG. 11 illustrates a flowchart of a process method in accordance with an embodiment of the present disclosure when a state of stall speed of the motor 12 occurs.

The process method is summarized as follows. In response to the shifting average value greater than a current upper limit value and the speed of the motor 12 greater than a speed upper limit value, the motor driving controller 14 controls the speed of the motor 12 to be decreased in a multistage manner. When it is determined, according to the shifting average value and the speed, that the motor is not normal after the speed of the motor 12 is decreased for one stage, the speed is decreased again. When the motor is normal, the speed is increased. When it is determined, according to the shifting average value and the speed, that the motor is normal after the speed is decreased again, the speed is increased in a multistage manner. When the motor is still not normal, the speed is decreased again. When it is determined, according to the shifting average value and the speed, that the motor is not normal after the speed is increased, the speed is decreased. When the motor is normal, the speed is increased again. The above operations last shorter than a predetermined time and the motor driving controller 14 controls the motor 12 to be operated at a highest one of speeds that can be operated normally. The speeds that can be operated normally are equal to or lower than an original speed which is set before the above operations. After duration of the above operations reaches the predetermined time and the shifting average value and the speed are not normal, the motor driving controller 14 controls the motor 12 to stop operating. In the above operations, the shifting average value is determined according to the dynamic and shifting multiple average values, and the speed is determined according to the set speed at that time.

Figure 12:
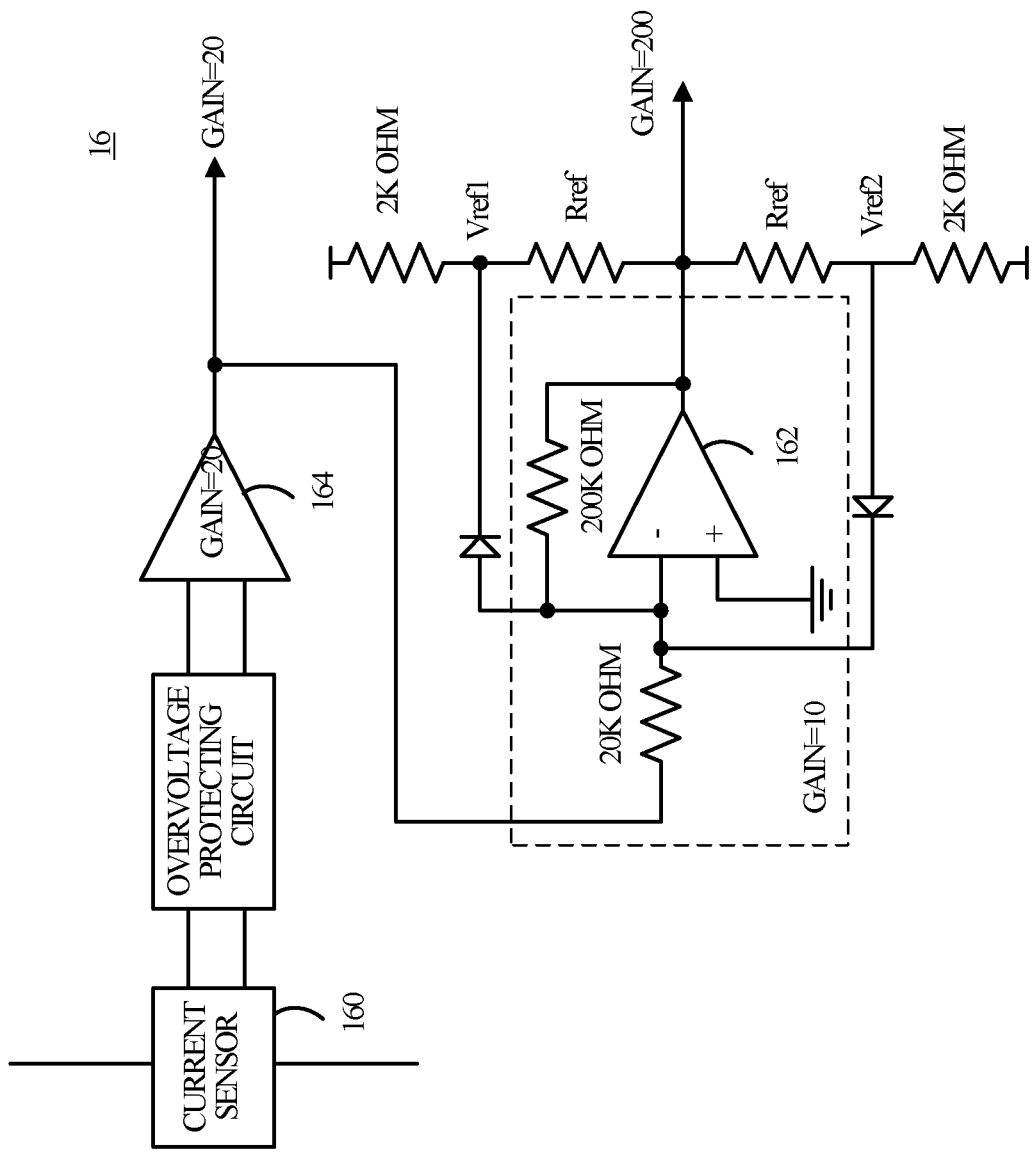
FIG. 12 illustrates a circuit diagram of the current detection unit in FIG. 1.

Please refer to FIG. 1 and FIG. 12. FIG. 12 illustrates a circuit diagram of the current detection unit 16 in FIG. 1.

The current detection unit 16 has at least two detecting magnifications. When the pump 10 is separated from the motor 12, there is no water in the pump 10, or the amount of water in the pump 10 is lower than the amount in a normal state, the current detection unit 16 uses the highest one of the at least two detecting magnifications.

The current detection unit 16 may comprise a current sensor 160, a basic amplifier 164 and a cascade amplifier 162. The current sensor 160 may be a shunt resistor, a current transformer or a Hall current sensor. When an input voltage of the cascade amplifier 162 is greater than Vref1 and Vref2, a gain of the cascade amplifier 162 approaches 1.

Figure 13:
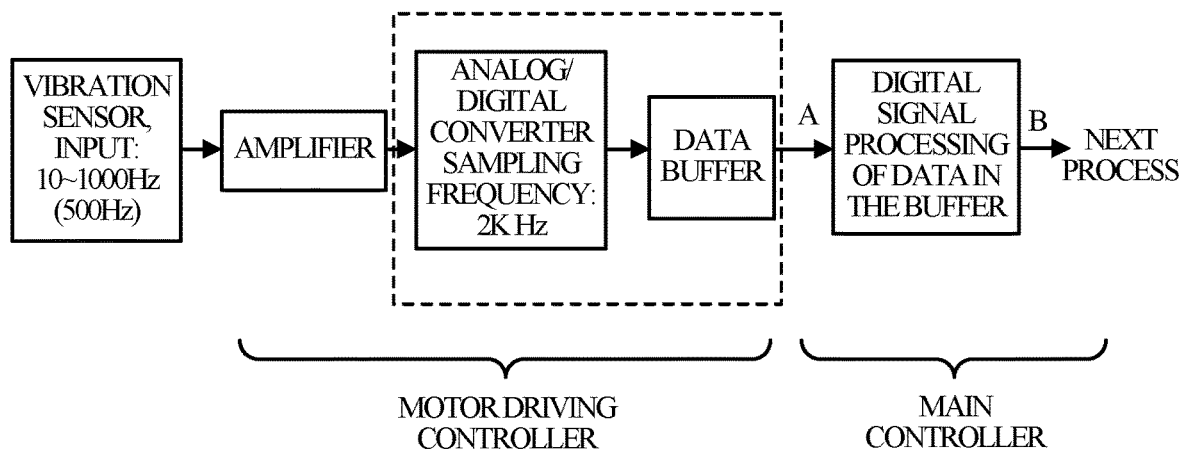
FIG. 13 to FIG. 15 illustrate a vibration protecting mechanism in accordance with an embodiment of the present disclosure.
Figure 14:
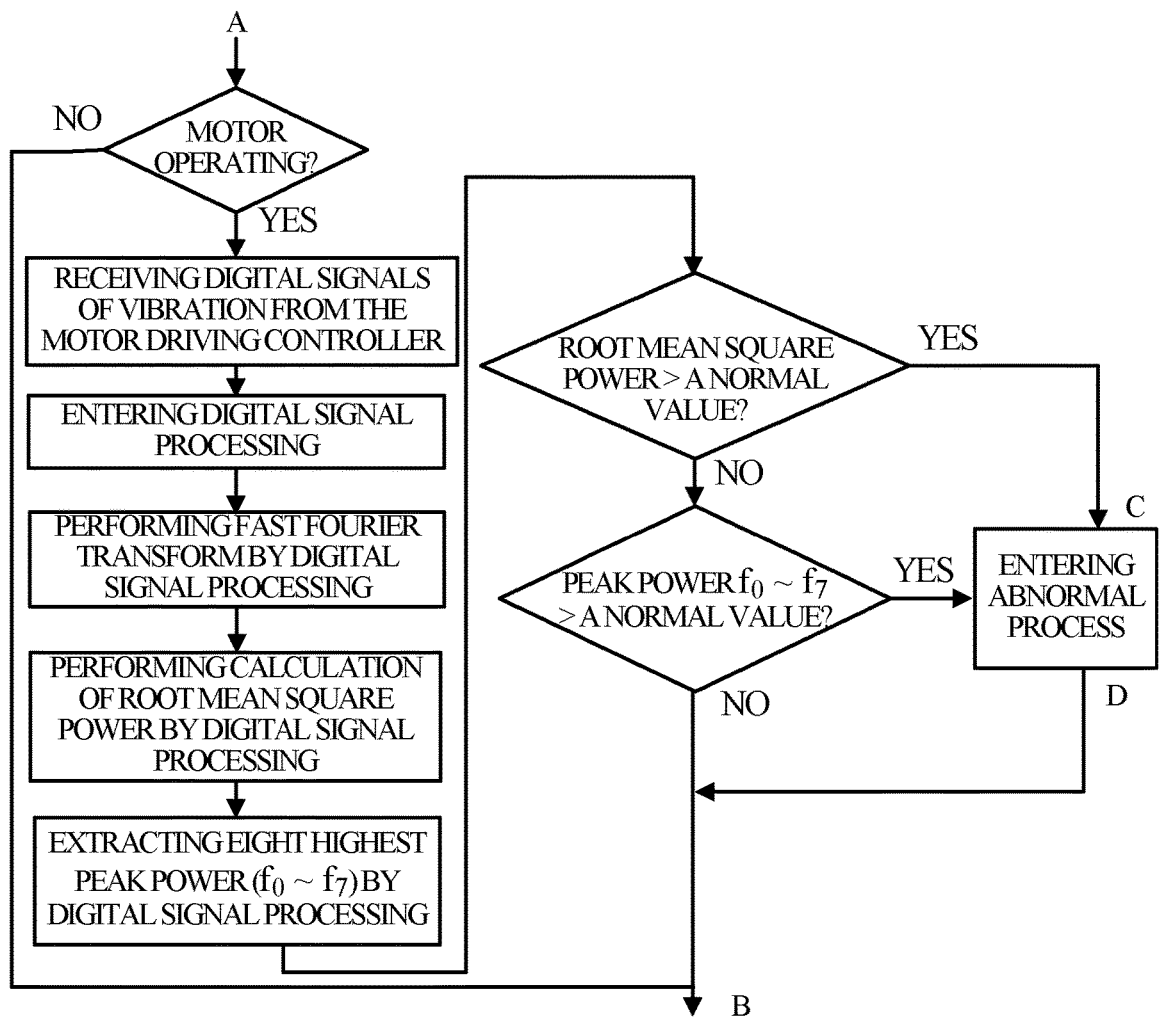
Figure 15:
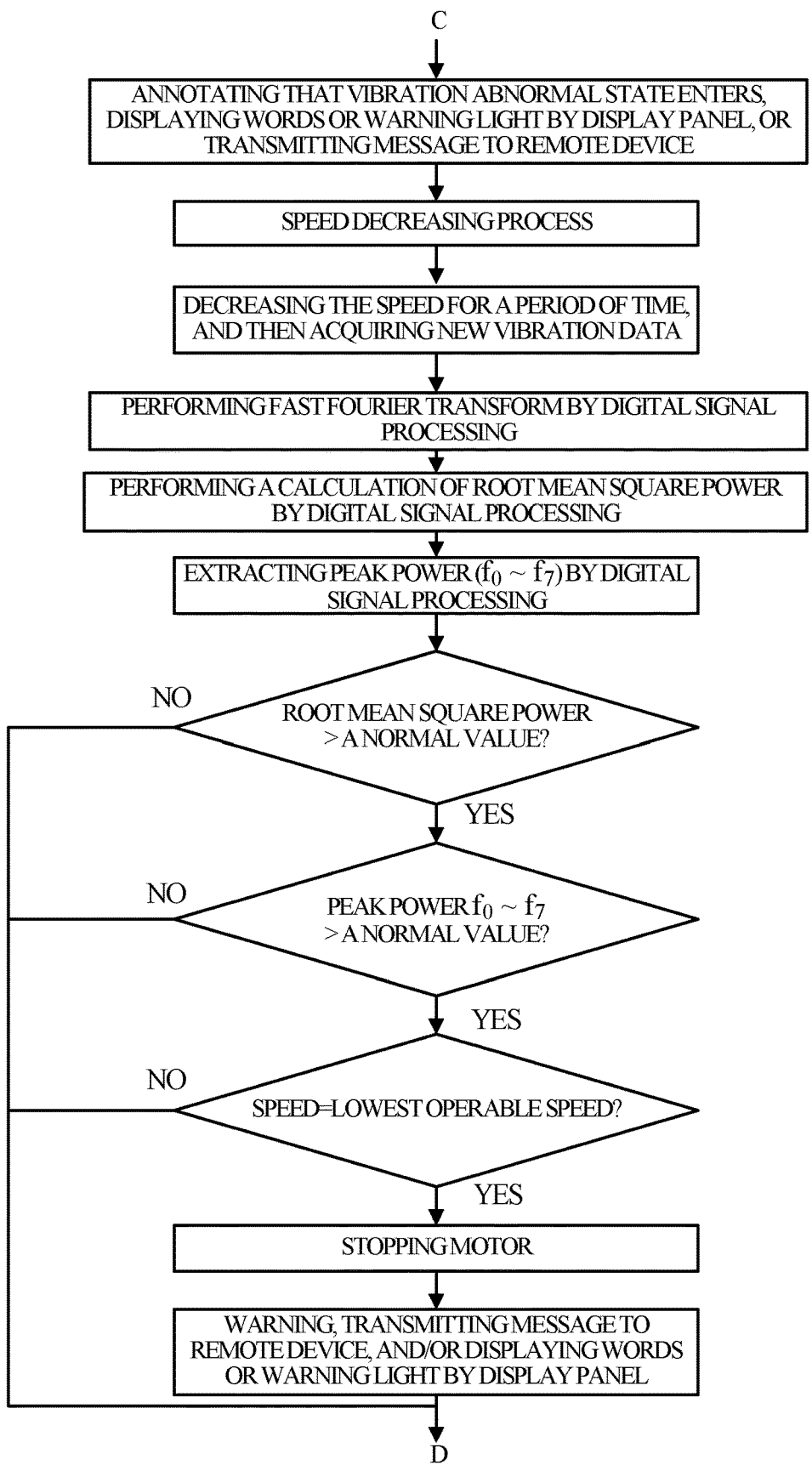

Please refer to FIG. 1 and FIG. 13 to FIG. 15. FIG. 13 to FIG. 15 illustrate a vibration protecting mechanism in accordance with an embodiment of the present disclosure.

The pump control system of the present disclosure further comprises a vibration sensor 34, for example, a G sensor. The vibration sensor 34 is configured to sense a vibration variation of the pump control system. At least one of the motor driving controller 14 and the main controller 18 controls the speed of the motor 12 to be decreased in a multistage manner in response to the vibration variation. When the vibration variation is normal, the speed is increased. When the vibration variation is not normal, the speed is decreased again. When the vibration variation is normal after the speed is decreased again, the speed is increased in a multistage manner. When the vibration variation is not normal, the speed is decreased again. When the vibration variation is normal after the speed is increased, the speed is increased again. When the vibration variation is not normal, the speed is decreased again. The above operations last shorter than a predetermined time, and at least one of the motor driving controller 14 and the main controller 18 controls the motor 12 to be operated at a highest one of speeds that can be operated normally. The speeds that can be operated normally are equal to or lower than an original speed which is set before the above operations. After duration of the above operations reaches the predetermined time and the vibration variation is not normal, at least one of the motor driving controller 14 and the main controller 18 controls the motor 12 to stop operating.

Figure 16:
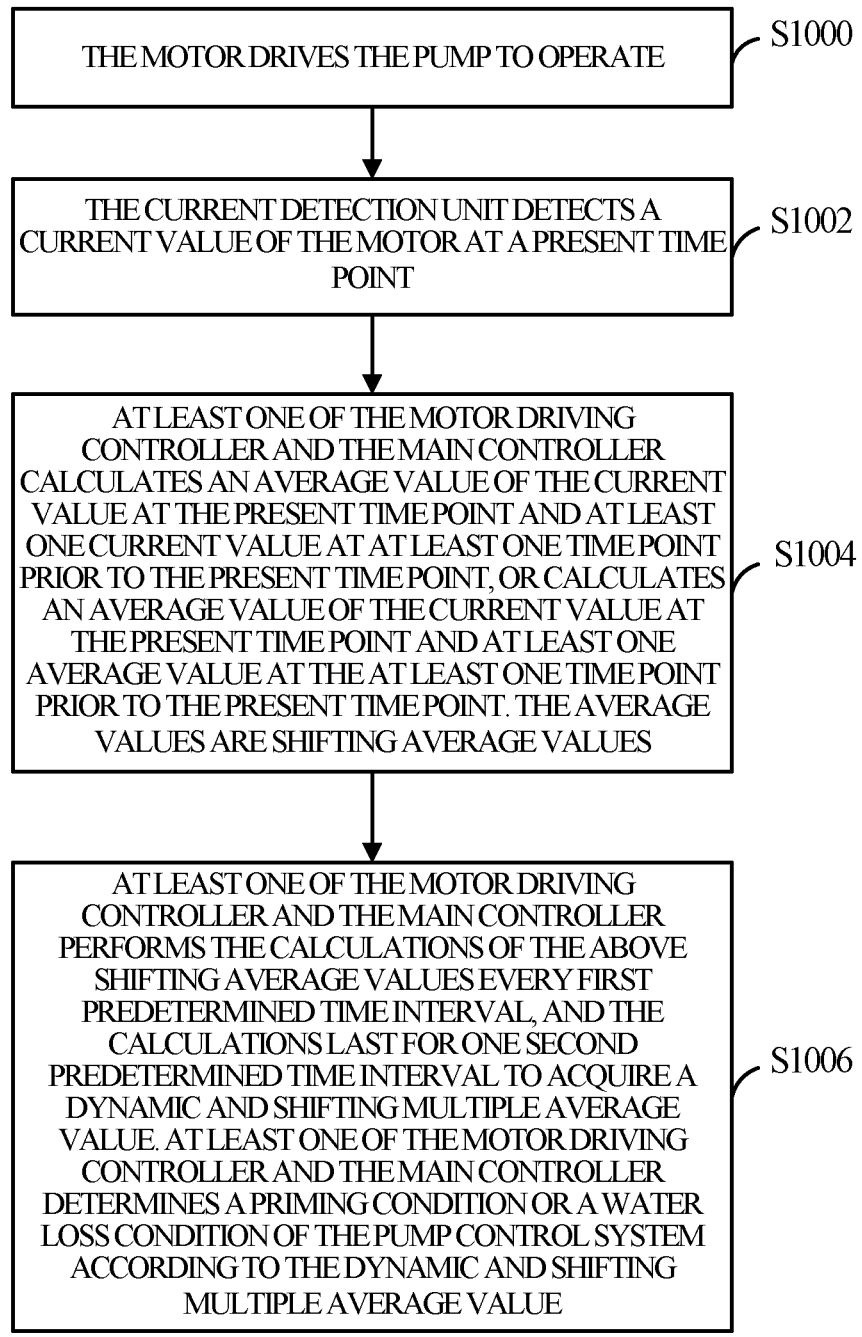
FIG. 16 illustrates a flowchart of an operating method of a pump control system in accordance with an embodiment of the present disclosure.

Please refer to FIG. 16. FIG. 16 illustrates a flowchart of an operating method of a pump control system in accordance with an embodiment of the present disclosure. The pump control system comprises a pump, a motor mechanically connected to the pump, a motor driving controller electrically coupled to the motor, a current detection unit electrically coupled between the motor and the motor driving controller or electrically coupled to a power supply input interface of the pump control system, and a main controller electrically coupled to the motor driving controller. The operating method of the pump control system comprises the following steps.

In step S1000, the motor drives the pump to operate.

In step S1002, the current detection unit detects a current value of the motor at a present time point.

In step S1004, at least one of the motor driving controller and the main controller calculates an average value of the current value at the present time point and at least one current value at at least one time point prior to the present time point, or calculates an average value of the current value at the present time point and at least one average value (i.e., current average value) at the at least one time point prior to the present time point. The average values are shifting average values.

In step S1006, at least one of the motor driving controller and the main controller performs the calculations of the above shifting average values every first predetermined time interval, and the calculations last for one second predetermined time interval to acquire a dynamic and shifting multiple average value. At least one of the motor driving controller and the main controller determines a priming condition or a water loss condition of the pump control system according to the dynamic and shifting multiple average value. The second predetermined time interval is longer than the first predetermined time interval.

The operating method of the pump control system of the present disclosure further comprises controlling, in response to the shifting average value, the motor to keep on operating or stop operating by at least one of the motor driving controller and the main controller.

In one embodiment, the step of controlling, in response to the shifting average value, the motor to keep on operating or stop operating by at least one of the motor driving controller and the main controller comprises controlling the motor to keep on operating by at least one of the motor driving controller and the main controller, when a positive or negative slope of the shifting average values of the motor in a period is within a range.

In another embodiment, the step of controlling, in response to the shifting average value, the motor to keep on operating or stop operating by at least one of the motor driving controller and the main controller comprises controlling the motor to stop operating by at least one of the motor driving controller and the main controller, when a positive or negative slope of the shifting average values of the motor in the period is not within the range.

In yet another embodiment, the step of controlling, in response to the shifting average value, the motor to keep on operating or stop operating by at least one of the motor driving controller and the main controller comprises predicting the motor to be abnormal and controlling the motor to stop operating by at least one of the motor driving controller and the main controller, when a positive or negative slope of a plurality of the shifting average values of the motor in a period is out of a range.

In one embodiment, the pump control system further comprises a first temperature sensor configured to sense an ambient temperature surrounding the main controller; a second temperature sensor configured to sense a temperature of a heat sink, and the heat sink disposed in at least one of the motor and a power module; and a third temperature sensor configured to sense a temperature of the power module connected to the motor. The operating method of the pump control system further comprises the following operations. The main controller controls the speed of the motor to be decreased in a multistage manner in response to at least one of the temperature of the second temperature sensor and the temperature of the third temperature sensor greater than a corresponding upper limit value. When the temperature of the second temperature sensor and the temperature of the third temperature sensor are normal, the speed is increased. When at least one of the temperature of the second temperature sensor and the temperature of the third temperature sensor is not normal, the speed is decreased again. When the temperature of the second temperature sensor and the temperature of the third temperature sensor are normal after the speed is decreased again, the speed is increased in a multistage manner. When at least one of the temperature of the second temperature sensor and the temperature of the third temperature sensor is not normal, the speed is decreased again. When the temperature of the second temperature sensor and the temperature of the third temperature sensor are normal after the speed is increased, the speed is increased again. When at least one of the temperature of the second temperature sensor and the temperature of the third temperature sensor is not normal, the speed is decreased again. The above operations last shorter than a predetermined time, and the main controller controls the motor to be operated at a highest one of speeds that can be operated normally. The speeds that can be operated normally are equal to or lower than an original speed which is set before the above operations. After duration of the above operations reaches the predetermined time and at least one of the temperature of the second temperature sensor and the temperature of the third temperature sensor is not normal, the main controller controls the motor to stop operating. The upper limit values vary with the temperature of the first temperature sensor.

In another embodiment, the pump control system further comprises a first temperature sensor configured to sense an ambient temperature surrounding the main controller; a second temperature sensor configured to sense a temperature of a heat sink, and the heat sink disposed in at least one of the motor and a power module; and a third temperature sensor configured to sense a temperature of the power module connected to the motor. The operating method of the pump control system further comprises the following operations. When at least one of a positive or negative slope of the temperature of the second temperature sensor and a positive or negative slope of the temperature of the third temperature sensor is greater than a corresponding upper limit value, the main controller predicts the motor to be abnormal and controls the speed of the motor to be decreased. The corresponding upper limit value varies with the temperature of the first temperature sensor. Because the second temperature sensor and the third temperature sensor are disposed at different locations, the upper limit value corresponding to the second temperature sensor and the upper limit value corresponding to the third temperature sensor are different.

In one embodiment, the main controller comprises a first watchdog timer. When the main controller crashes, the first watchdog timer resets the main controller. The motor driving controller comprises a second watchdog timer. When the motor driving controller crashes, the second watchdog timer resets the motor driving controller. When the motor driving controller crashes and the second watchdog timer cannot be operated normally, the main controller resets the motor driving controller.

When a state of stall speed of the motor occurs, the operating method of the pump control system comprises the following operations. In response to the shifting average value greater than a current upper limit value and the speed of the motor greater than a speed upper limit value, the motor driving controller controls the speed of the motor to be decreased in a multistage manner. When the speed is decreased for one stage and it is determined, according to the shifting average value and the speed, that the motor is not normal, the speed is decreased again. When the motor is normal, the speed is increased. When it is determined, according to the shifting average value and the speed, that the motor is normal after the speed is decreased again, the speed is increased in a multistage manner. When the motor is not normal, the speed is decreased again. When it is determined, according to the shifting average value and the speed, that the motor is not normal after the speed of the motor is increased, the speed is decreased. When the motor is normal, the speed is increased again. The above operations last shorter than a predetermined time, and the motor driving controller controls the motor to be operated at a highest one of speeds that can be operated normally. The speeds that can be operated normally are equal to or lower than an original speed which is set before the above operations. After duration of the above operations reaches the predetermined time and the shifting average value and the speed are not normal, the motor driving controller controls the motor to stop operating. In the above operations, the shifting average value is determined according to the dynamic and shifting multiple average values, and the speed is determined according to the set speed at that time.

When a state of underspeed of the motor occurs, the operating method of the pump control system comprises the following operations. In response to the shifting average value greater than a current upper limit value and the speed of the motor lower than a speed lower limit value, the motor driving controller controls the speed of the motor to be changed arbitrarily for several times in a period of time first, and then to be set at a speed lower than an originally set speed. When it is determined, according to the shifting average value and the speed, that the motor is still not normal, the motor is controlled to be overloaded and operated for a period of time and then the speed is set at a speed lower than the originally set speed. When the motor is normal, the speed remains for a period of time and then is controlled to be increased in a multistage manner. When it is determined, according to the shifting average value and the speed, that the motor is still not normal after the motor is overloaded and operated for the period of time and then the speed is set at the speed lower than the originally set speed, the speed of the motor is controlled to be changed arbitrarily for several times in a period of time first, and then to be set at a speed lower than the originally set speed. When the motor is normal, the speed remains for a period of time and then is controlled to be increased in a multistage manner. When the motor driving controller controls the speed of the motor to be increased in a multistage manner but the motor is still not normal, the motor driving controller controls the speed of the motor to be changed arbitrarily for several times in a period of time first, and then to be set at a speed lower than the originally set speed. When it is determined, according to the shifting average value and the speed, that the motor is still not normal after the motor driving controller controls the speed of the motor to be changed arbitrarily for several times in a period of time first and then to be set at the speed lower than the originally set speed, the motor is controlled to be overloaded and operated for a period of time and then the speed is set at a speed lower than the originally set speed. When the motor is normal, the speed remains for a period of time and then is controlled to be increased in a multistage manner. When the motor is still not normal after the motor driving controller controls the speed of the motor to be increased in a multistage manner, the motor is controlled to be overloaded and operated for a period of time and then the speed is set at a speed lower than the originally set speed. The above operations last shorter than a predetermined time, and the motor driving controller controls the motor to be operated at a highest one of speeds that can be operated normally. The speeds that can be operated normally are equal to or lower than an original speed which is set before the above operations. After duration of the above operations reaches the predetermined time and the shifting average value and the speed are not normal, the motor driving controller controls the motor to stop operating. In the above operations, the shifting average value is determined according to the dynamic and shifting multiple average values, and the speed is determined according to the set speed at that time.

When it is determined, according to the shifting average value and the speed, the motor is still not normal after the motor driving controller controls the speed of the motor to be changed arbitrarily for several times or controls the motor to be overloaded and operated and the speed is set at a first speed lower than the originally set speed, the speed is set to a second speed lower than the originally set speed after the motor driving controller controls the motor to be overloaded and operated or controls the speed of the motor to be changed arbitrarily for several times in the following steps. The second speed is lower than the first speed.

In one embodiment, the pump control system further comprises a vibration sensor. The operating method of the pump control system further comprises the following operations. The vibration sensor senses a vibration variation of the pump control system. At least one of the motor driving controller and the main controller controls the speed of the motor to be decreased in a multistage manner in response to the vibration variation. When the vibration variation is normal, the speed is increased. When the vibration variation is not normal, the speed is decreased again. When the vibration variation is normal after the speed is decreased again, the speed is increased in a multistage manner. When the vibration variation is not normal, the speed is decreased again. When the vibration variation is normal after the speed is increased, the speed is increased again. When the vibration variation is not normal, the speed is decreased again. The above operations last shorter than a predetermined time, and at least one of the motor driving controller and the main controller controls the motor to be operated at a highest one of speeds that can be operated normally. The speeds that can be operated normally are equal to or lower than an original speed which is set before the above operations. After duration of the above operations reaches the predetermined time and the vibration variation is not normal, at least one of the motor driving controller and the main controller controls the motor to stop operating.

The time points at which the current detection unit detects the current values of the motor are synchronous with a power supply which drives the motor.

The current detection unit has at least two detecting magnifications. When the pump is separated from the motor, there is no water in the pump, or the amount of water in the pump is lower than the amount in a normal state, the current detection unit uses the highest one of the at least two detecting magnifications.

In one embodiment, the operating method of the pump control system further comprises an initial setting process. The initial setting process comprises: determining whether to enter a learning mode by at least one of the motor driving controller and the main controller; if yes, starting up the motor and controlling the motor to operate at a priming speed by motor driving controller; if no, the initial setting process ends; starting to count time by at least one of the motor driving controller and the main controller; calculating, in a shifting average manner, to acquire a dynamic and shifting multiple average value in a short time by at least one of the motor driving controller and the main controller, and storing the dynamic and shifting multiple average value in the short time by at least one of the motor driving controller and the main controller; performing the calculations for several times to acquire a plurality of dynamic and shifting multiple average values in a short time and storing same, when the time is equal to or shorter than a predetermined time; storing a last one of the dynamic and shifting multiple average values in a short time, when the time is longer than the predetermined time, wherein the last one of the dynamic and shifting multiple average values in a short time is served as a reference current value of the priming speed; and ending.

Each of the dynamic and shifting multiple average values is acquired, according to continuous detections and calculations in a predetermined time interval at each time point in a practical operation. The dynamic and shifting multiple average values have different values in response to the use time, the aging of machines or the changes of devices. The dynamic and shifting multiple average values are served as reference values or upper limit values of at least one of the motor driving controller and the main controller.

The dynamic and shifting multiple average value is an average value of a value at a present time point and at least one value at at least one time point prior to the present time point. The present time point and the at least one time point prior to the present time point are continuous time points, and the present time point is shifted from the at least one time point prior to the present time point with a predetermined time interval. The predetermined time interval is a time interval between the present time point and the at least one time point prior to the present time point. When the predetermined time interval is 1 second, the dynamic and shifting multiple average value is acquired every second. When the predetermined time interval is 1 minute, the dynamic and shifting multiple average value is acquired every minute. When the predetermined time interval is 1 hour, the dynamic and shifting multiple average value is acquired every hour. When the predetermined time interval is 1 day, the dynamic and shifting multiple average value is acquired every day. When the predetermined time interval is 1 month, the dynamic and shifting multiple average value is acquired every month. When the predetermined time interval is 1 season, the dynamic and shifting multiple average value is acquired every season. When the predetermined time interval is 1 year, the dynamic and shifting multiple average value is acquired every year. Each time point can have plural dynamic and shifting multiple average values of different predetermined time intervals, and it is required to choose, according to different machines, different devices or different operating conditions, one of the dynamic and shifting multiple average values of different time intervals as a determination reference.

In one embodiment, at least one of the dynamic and shifting multiple average values of every day, every month, every season, and every year is stored.

In the pump control system and the operating method thereof, a dynamic and shifting multiple average value is acquired by a dynamic and floating monitoring mechanism. In detail, the dynamic and shifting multiple average value is an average value of a plurality of values, which are acquired by continuously detecting each time point in a predetermined time interval when the pump control system is operated in practice. The average value can be generated correctly corresponding to practical characteristics of the pump control system in response to the use time, the aging of the machines or the changes of the devices. Therefore, the pump control system of the present disclosure can make a correct determination in response to various operating conditions. The pump control system may only store the dynamic and shifting multiple average values in a long time according to requirements, for example, an average value of every month or every season, thereby analyzing characteristic changes of the pump control system in a long time and predicting the trend in the future.

Furthermore, in the present disclosure, the average values are acquired in a shifting and average manner. That is, average operations are performed on a plurality of continuous values. When a few of the values vary unstably, the effect of unstable values can be decreased by the average operations, so that the pump control system does not determine incorrectly due to the few of the unstable values. The present disclosure may further use the least squares method to smooth the changes of the directly measured and continuous values, so that the pump control system does not determine incorrectly.

In the present disclosure, the current detection unit having a high detecting magnification is used. Accordingly, when the pump is separated from the motor or there is no water in the pump, the current detection unit can measure an operating current approaching zero, so that the pump control system can make a determination accurately.

In the prior art, strong electrical interference signals are generated when a motor is operated. A conventional motor driving controller comprises a watchdog timer thereof. When the conventional motor driving controller crashes due to the electrical interference signals, the watchdog timer can reset the conventional motor driving controller to restart the conventional motor driving controller. Accordingly, the conventional motor driving controller is capable of recovering automatically when the conventional motor driving controller crashes. However, the conventional motor driving controller is a device near the motor most. The conventional motor driving controller and the watchdog timer thereof might crash simultaneously, and thus the conventional motor driving controller cannot recover automatically. In the present disclosure, the main controller is strongly isolated from other circuits (including the motor and the motor driving controller). The main controller always monitors the operating state of the motor driving controller. When the motor driving controller and the watchdog timer thereof crash simultaneously, the main controller resets the motor driving controller, so as to recover the motor driving controller.

Figure 17:
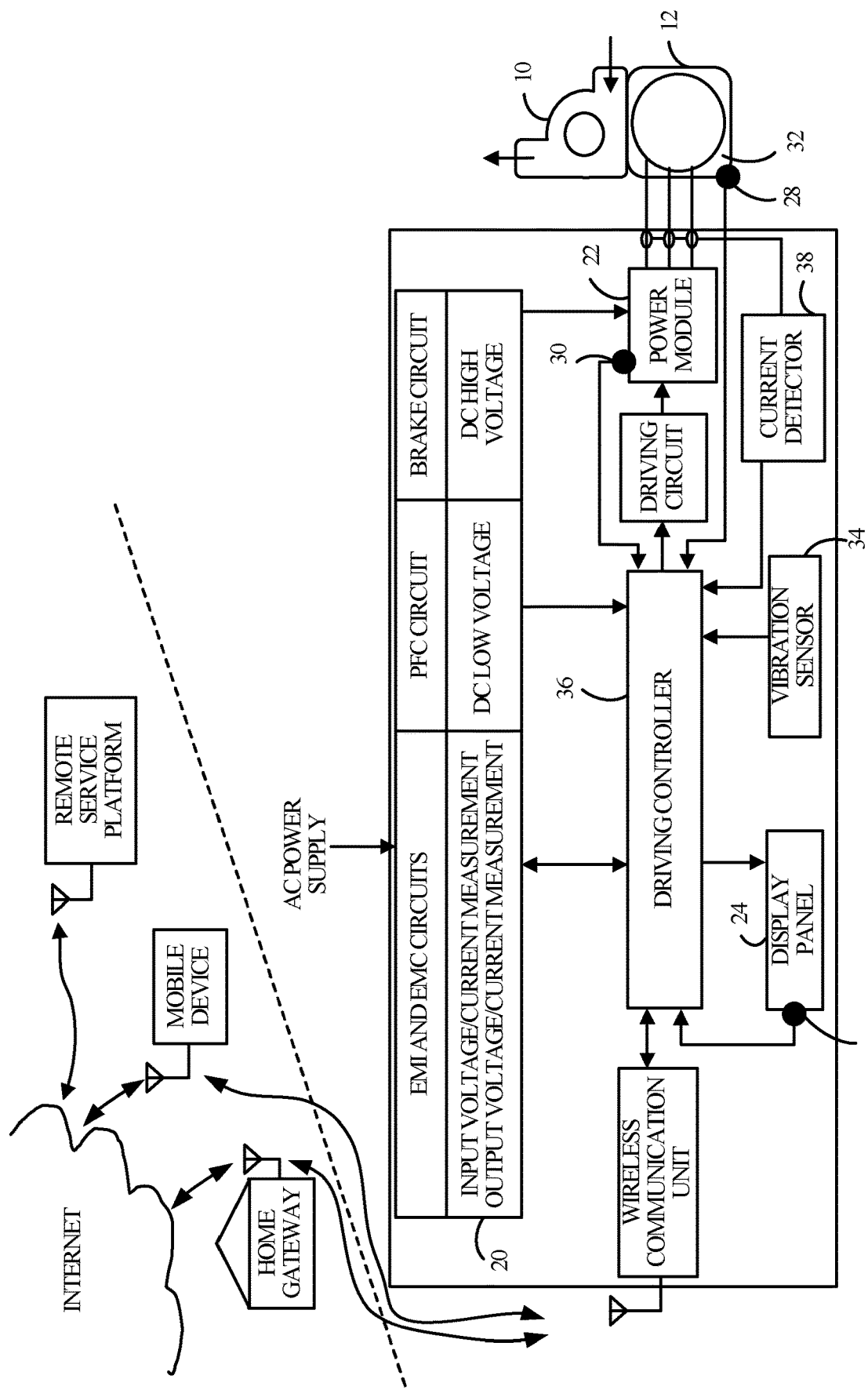
FIG. 17 illustrates a pump control system in accordance with another embodiment of the present disclosure.

Please refer to FIG. 17. FIG. 17 illustrates a pump control system in accordance with another embodiment of the present disclosure. The pump control system is configured to control a water supply system, for example but not limited to a swimming pool.

A difference of the pump control system in FIG. 17 and the pump control system in FIG. 1 is that the pump control system in FIG. 1 comprises the motor driving controller 14 and the main controller 18 (two controllers), but the pump control system in FIG. 17 comprises a driving controller 36 (one controller).

Furthermore, the current detection unit 16 in the pump control system in FIG. 1 has high precision for improving the calculations of the shifting average values. A current detector 38 in the pump control system in FIG. 17 is configured to detect a current of the motor 12 but does not have an extra magnification function more than the basic amplifier 164 in FIG. 12. That is, precision of the current detector 38 is lower than the precision of the current detection unit 16 in FIG. 1. In detail, the current detector 38 only comprises the basic amplifier 164 in FIG. 12. The current detection unit 16 comprises the basic amplifier 164 and the cascade amplifier 162 in FIG. 12.

The components in FIG. 17 which are not described can be referred to the descriptions of FIG. 1 and are not repeated herein.

The motor 12 is mechanically connected to the pump 10.

The driving controller 36 is electrically coupled to the motor 12. The driving controller 36 is configured to control a speed of the motor 12. The driving controller 36 is further configured to detect the speed of the motor 12.

The driving controller 36 is configured to control the speed of the motor 12 to be changed in a multistage manner in response to an abnormal triggering event, so as to recover the pump control system to an originally set stable state. The stable state is a state in which a user sets the pump control system to be operated normally. The abnormal triggering event is generated by at least one physical parameter when the pump control system is operated. The at least one physical parameter may be but not limited to a temperature, a vibration or the speed. The above stable state may be but not limited to a situation that the at least one physical parameter, a voltage or a current is in a range when the pump control system is operated normally. In one embodiment, the first temperature sensor 26 is configured to sense an ambient temperature surrounding the driving controller 36. The second temperature sensor 28 is configured to sense a temperature of the heat sink 32. The heat sink 32 is disposed in at least one of the motor 12 and the power module 22. The third temperature sensor 30 is configured to sense a temperature of the power module 22 connected to the motor 12.

The abnormal triggering event is that at least one of the temperature of the second temperature sensor 28 and the temperature of the third temperature sensor 30 is greater than a corresponding upper limit value. The driving controller 36 controls the speed of the motor 12 to be decreased in a multistage manner in response to the abnormal triggering event. When the temperature of the second temperature sensor 28 and the temperature of the third temperature sensor 30 are normal, the speed is increased. When at least one of the temperature of the second temperature sensor 28 and the temperature of the third temperature sensor 30 is not normal, the speed is decreased again. When the temperature of the second temperature sensor 28 and the temperature of the third temperature sensor 30 are normal after the speed of the motor 12 is decreased again, the speed is increased in a multistage manner. When at least one of the temperature of the second temperature sensor 28 and the temperature of the third temperature sensor 30 is not normal, the speed is decreased again. When the temperature of the second temperature sensor 28 and the temperature of the third temperature sensor 30 are normal after the speed is increased, the speed is increased again. When at least one of the temperature of the second temperature sensor 28 and the temperature of the third temperature sensor 30 is not normal, the speed is decreased again. The above operations last shorter than a predetermined time, and the driving controller 36 controls the motor 12 to be operated at a highest one of speeds that can be operated normally. The speeds that can be operated normally are equal to or lower than an original speed which is set before the above operations. After duration of the above operations reaches the predetermined time and at least one of the temperature of the second temperature sensor 28 and the temperature of the third temperature sensor 30 is not normal, the driving controller 36 controls the motor 12 to stop operating. The upper limit values vary with the temperature of the first temperature sensor 26. Because the second temperature sensor 28 and the third temperature sensor 30 are disposed at different locations, the upper limit value corresponding to the second temperature sensor 28 and the upper limit value corresponding to the third temperature sensor 30 are different.

In another embodiment, the abnormal triggering event is that at least one of a positive or negative slope of the temperature of the second temperature sensor 28 and a positive or negative slope of the temperature of the third temperature sensor 30 is greater than a corresponding upper limit value. The driving controller 36 predicts the motor to be abnormal and controls the speed of the motor 12 to be decreased in a multistage manner. The corresponding upper limit value varies with the temperature of the first temperature sensor 26.

In another embodiment, the abnormal triggering event is a vibration variation of the pump control system sensed by the vibration sensor 34. The driving controller 36 controls the speed of the motor 12 to be decreased in a multistage manner in response to the abnormal triggering event. When the vibration variation is normal, the speed is increased. When the vibration variation is not normal, the speed is decreased again. When the vibration variation is normal after the speed of the motor 12 is decreased again, the speed is increased in a multistage manner. When the vibration variation is not normal, the speed is decreased again. When the vibration variation is normal after the speed of the motor 12 is increased, the speed is increased again. When the vibration variation is not normal, the speed is decreased again. The above operations last shorter than a predetermined time, and the driving controller 36 controls the motor 12 to be operated at a highest one of speeds that can be operated normally. The speeds that can be operated normally are equal to or lower than an original speed which is set before the above operations. After duration of the above operations reaches the predetermined time and the vibration variation is not normal, the driving controller 36 controls the motor 12 to stop operating.

Please refer to FIG. 10 and FIG. 17. FIG. 10 illustrates a flowchart of a process method when a state of underspeed of the motor 12 in FIG. 17 occurs.

In FIG. 10 and FIG. 17, the abnormal triggering event is that the current detected by the current detector 38 is greater than a current upper limit value and the speed of the motor 12 is lower than a speed lower limit value. The process method is summarized as follows. In response to the abnormal triggering event, the driving controller 36 controls the speed of the motor 12 to be changed arbitrarily for several times in a period of time first, and then to be set at a speed lower than an originally set speed. When it is determined, according to the current and the speed, that the motor is still not normal, the motor 12 is controlled to be overloaded and operated for a period of time and then the speed is set at a speed lower than the originally set speed. When it is determined that the motor is normal, the speed remains for a period of time and then the speed is controlled to be increased in a multistage manner. When it is determined, according to the current and the speed, that the motor is still not normal after the motor 12 is controlled to be overloaded and operated for the period of time and then the speed is set at the speed lower than the originally set speed, the motor 12 is controlled to be changed arbitrarily for several times in a period of time first, and then to be set at a speed lower than the originally set speed. When the motor is normal, the speed remains for a period of time and then the speed is controlled to be increased in a multistage manner. When the driving controller 36 controls the speed of the motor 12 to be increased in a multistage manner but the motor is still not normal, the driving controller 36 controls the speed to be changed arbitrarily for several times in a period of time first, and then to be set at a speed lower than the originally set speed. When it is determined, according to the current and the speed, that the motor is still not normal after the driving controller 36 controls the speed to be changed arbitrarily for several times in the period of time first and then to be set at the speed lower than the originally set speed, the motor 12 is controlled to be overloaded and operated for a period of time and then the speed is set at a speed lower than the originally set speed. When the motor is normal, the speed remains for a period of time and then the speed of the motor 12 is controlled to be increased in a multistage manner. When it is determined that motor is still not normal after the driving controller 36 controls the speed of the motor 12 to be increased in a multistage manner, the motor 12 is controlled to be overloaded and operated for a period of time and then to be set at a speed lower than the originally set speed. The above operations last shorter than a predetermined time, and the driving controller 36 controls the motor 12 to be operated at a highest one of speeds that can be operated normally. The speeds that can be operated normally are equal to or lower than an original speed which is set before the above operations. After duration of the above operations reaches the predetermined time and the current and the speed are not normal, the driving controller 36 controls the motor 12 to stop operating. In the above operations, the speed is determined according to the set speed at that time.

When it is determined, according to the current and the speed, that the motor is still not normal after the driving controller 36 controls the speed of the motor 12 to be changed arbitrarily for several times or controls the motor 12 to be overloaded and operated and the speed is set at a first speed lower than the originally set speed, the speed is set to a second speed lower than the originally set speed after the driving controller 36 controls the motor 12 to be overloaded and operated or controls the speed to be changed arbitrarily for several times in the following steps. The second speed is lower than the first speed.

It is noted that the process method in FIG. 10 can be applied to the pump control system in FIG. 17 and the pump control system in FIG. 1 when the state of underspeed of the motor 12 occurs.

Please refer to FIG. 11 and FIG. 17. FIG. 11 illustrates a flowchart of a process method when a state of stall speed of the motor 12 in FIG. 17 occurs.

In FIG. 11 and FIG. 17, the abnormal triggering event is that the current detected by the current detector 38 is greater than a current upper limit value and the speed of the motor 12 is greater than a speed upper limit value. The process method is summarized as follows. In response to the abnormal triggering event, the driving controller 36 controls the speed of the motor 12 to be decreased in a multistage manner. When it is determined, according to the current and the speed, that the motor is still not normal after the speed is decreased for one stage, the speed is decreased again. When the motor is normal, the speed of the motor 12 is increased. When it is determined, according to the current and the speed, that the motor is normal after the speed is decreased again, the speed is increased in a multistage manner. When the motor is not normal, the speed is decreased again. When it is determined, according to the current and the speed, that the motor is not normal after the speed is increased, the speed is decreased. When the motor is normal, the speed is increased again. The above operations last shorter than a predetermined time, and the driving controller 36 controls the motor 12 to be operated at a highest one of speeds that can be operated normally. The speeds that can be operated normally are equal to or lower than an original speed which is set before the above operations. After duration of the above operations reaches the predetermined time and the current and the speed are not normal, the driving controller 36 controls the motor 12 to stop operating. In the above operations, the speed is determined according to the set speed at that time.

It is noted that the process method in FIG. 11 can be applied to the pump control system in FIG. 17 and the pump control system in FIG. 1 when the state of stall speed of the motor 12 occurs.

Figure 18:
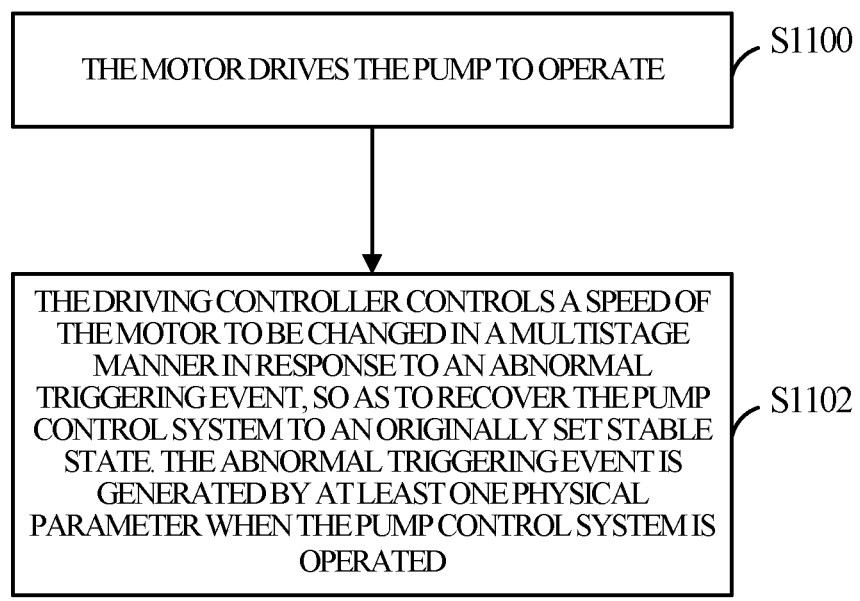
FIG. 18 illustrates a flowchart of an abnormal processing and recovering method of a pump control system in accordance with an embodiment of the present disclosure.

Please refer to FIG. 18. FIG. 18 illustrates a flowchart of an abnormal processing method of a pump control system in accordance with an embodiment of the present disclosure. The pump control system comprises a pump, a motor mechanically connected to the pump, and a driving controller electrically coupled to the motor. The abnormal processing method of the pump control system comprises the following steps.

In step S1100, the motor drives the pump to operate.

In step S1102, the driving controller controls a speed of the motor to be changed in a multistage manner in response to an abnormal triggering event, so as to recover the pump control system to an originally set stable state. The abnormal triggering event is generated by at least one physical parameter when the pump control system is operated.

In one embodiment, the pump control system further comprises a first temperature sensor configured to sense an ambient temperature surrounding the driving controller; a second temperature sensor configured to sense a temperature of a heat sink, and the heat sink disposed in at least one of the motor and a power module; and a third temperature sensor configured to sense a temperature of the power module connected to the motor. The abnormal triggering event is that at least one of the temperature of the second temperature sensor and the temperature of the third temperature sensor is greater than a corresponding upper limit value. Step S1102 comprises the following operations. The driving controller controls the speed of the motor to be decreased in a multistage manner in response to abnormal triggering event. When the temperature of the second temperature sensor and the temperature of the third temperature sensor are normal, the speed is increased. When at least one of the temperature of the second temperature sensor and the temperature of the third temperature sensor is not normal, the speed is decreased again. When the temperature of the second temperature sensor and the temperature of the third temperature sensor are normal after the speed is decreased again, the speed of the motor is increased in a multistage manner. When at least one of the temperature of the second temperature sensor and the temperature of the third temperature sensor is not normal, the speed is decreased again. When the temperature of the second temperature sensor and the temperature of the third temperature sensor are normal after the speed is increased, the speed is increased again. When at least one of the temperature of the second temperature sensor and the temperature of the third temperature sensor is not normal, the speed is decreased again. The above operations last shorter than a predetermined time, and the driving controller controls the motor to be operated at a highest one of speeds that can be operated normally. The speeds that can be operated normally are equal to or lower than an original speed which is set before the above operations. After duration of the above operations reaches the predetermined time and at least one of the temperature of the second temperature sensor and the temperature of the third temperature sensor is not normal, the driving controller controls the motor to stop operating. The upper limit values vary with the temperature of the first temperature sensor.

In another embodiment, the pump control system further comprises a first temperature sensor configured to sense an ambient temperature surrounding the driving controller; a second temperature sensor configured to sense a temperature of a heat sink, and the heat sink disposed in at least one of the motor and a power module; and a third temperature sensor configured to sense a temperature of the power module connected to the motor. The abnormal triggering event is that at least one of a positive or negative slope of the temperature of the second temperature sensor and a positive or negative slope of the temperature of the third temperature sensor is greater than a corresponding upper limit value. Step S1102 comprises the following operations. In response to the abnormal triggering events, the driving controller predicts the motor to be abnormal and controls the speed of the motor to be decreased in a multistage manner. The corresponding upper limit value varies with the temperature of the first temperature sensor.

In yet another embodiment, the pump control system further comprises a vibration sensor. The abnormal triggering event is a vibration variation of the pump control system sensed by the vibration sensor. Step S1102 comprises the following operations. The driving controller controls the speed of the motor to be decreased in a multistage manner in response to the abnormal triggering event. When the vibration variation is normal, the speed is increased. When the vibration variation is not normal, the speed is decreased again. When the vibration variation is normal after the speed is decreased again, the speed is increased in a multistage manner. When the vibration variation is not normal, the speed is decreased again. When the vibration variation is normal after the speed is increased, the speed is increased again. When the vibration variation is not normal, the speed is decreased again. The above operations last shorter than a predetermined time, and the driving controller controls the motor to be operated at a highest one of speeds that can be operated normally. The speeds that can be operated normally are equal to or lower than an original speed which is set before the above operations. After duration of the above operations reaches the predetermined time and the vibration variation is not normal, the driving controller controls the motor to stop operating.

In yet another embodiment, the pump control system further comprises a current detector. The current detector is configured to detect a current of the motor. The abnormal triggering event is that the current is greater than a current upper limit value and the speed of the motor is lower than a speed lower limit value. Step S1102 comprises the following operations. In response to the abnormal triggering event, the driving controller controls the speed of the motor to be changed arbitrarily for several times in a period of time first, and then to be set at a speed lower than an originally set speed. When it is determined, according to the current and the speed, that the motor is still not normal, the motor is controlled to be overloaded and operated for a period of time and then the speed is set at a speed lower than the originally set speed. When it is determined that the motor is normal, the speed remains for a period of time and then the speed is controlled to be increased in a multistage manner. When it is determined, according to the current and the speed, that the motor is still not normal after the motor is controlled to be overloaded and operated for the period of time and then the speed is set at the speed lower than the originally set speed, the speed of the motor is controlled to be changed arbitrarily for several times in a period of time first, and then to be set at a speed lower than the originally set speed. When the motor is normal, the speed remains for a period of time and then the speed is controlled to be increased in a multistage manner. When the motor is not normal after the driving controller controls the speed of the motor to be increased in a multistage manner, the driving controller controls the speed of the motor to be changed arbitrarily for several times in a period of time first, and then to be set at a speed lower than the originally set speed. When the motor is still not normal after the driving controller controls the speed of the motor to be changed arbitrarily for the several times in a period of time first and then to be set at the speed lower than the originally set speed, the motor is controlled to be overloaded and operated for a period of time and then the speed is set at a speed lower than the originally set speed. When the motor is normal, the speed remains for a period of time and then the speed is controlled to be increased in a multistage manner. When the motor is still not normal after the driving controller controls the speed of the motor to be increased in a multistage manner, the motor is controlled to be overloaded and operated for a period of time and then the speed is set at a speed lower than the originally set speed. The above operations last shorter than a predetermined time, and the driving controller controls the motor to be operated at a highest one of speeds that can be operated normally. The speeds that can be operated normally are equal to or lower than an original speed which is set before the above operations. After duration of the above operations reaches the predetermined time and the current and the speed are not normal, the driving controller controls the motor to stop operating. In the above operations, the speed is determined according to the set speed at that time.

When it is determined that the motor is still not normal after the driving controller controls the speed of the motor to be changed arbitrarily for several times or controls the motor to be overloaded and operated and the speed is set at a first speed lower than the originally set speed, the speed is set at a second speed lower than the originally set speed after the driving controller controls the motor to be overloaded and operated or controls the speed of the motor to be changed arbitrarily for several times in the following steps. The second speed is lower than the first speed.

In yet another embodiment, the pump control system further comprises a current detector. The current detector is configured to detect a current of the motor. The abnormal triggering event is that the current is greater than a current upper limit value and the speed of the motor is greater than a speed upper limit. Step S1102 comprises the following operations. In response to the abnormal triggering event, the driving controller controls the speed of the motor to be decreased in a multistage manner. When it is determined, according to the current and the speed, that the motor is still not normal after the speed is decreased for one stage, the speed is decreased again. When the motor is normal, the speed is increased. When it is determined, according to the current and the speed, that the motor is normal after the speed is decreased again, the speed is increased in a multistage manner. When the motor is not normal, the speed is decreased again. When it is determined, according to the current and the speed, that the motor is not normal after the speed is increased, the speed is decreased. When the motor is normal, the speed is increased again. The above operations last shorter than a predetermined time, and the driving controller controls the motor to be operated at a highest one of speeds that can be operated normally. The speeds that can be operated normally are equal to or lower than an original speed which is set before the above operations. After duration of the above operations reaches the predetermined time and the current and the speed are not normal, the driving controller controls the motor to stop operating. In the above operations, the speed is determined according to the set speed at that time.

In summary, although the present disclosure has been provided in the preferred embodiments described above, the foregoing preferred embodiments are not intended to limit the present disclosure. Those skilled in the art, without departing from the spirit and scope of the present disclosure, may make modifications and variations, so the scope of the protection of the present disclosure is defined by the claims.

What is claimed is:

1. A pump control system, having an abnormal processing function, the pump control system comprising:
   a pump;
   a motor mechanically connected to the pump; and
   a driving controller electrically coupled to the motor, and the driving controller configured to control a speed of the motor,
   wherein the driving controller is configured to control the speed of the motor to be changed in a multistage manner in response to an abnormal triggering event, so as to recover the pump control system to an originally set stable state,
   wherein the abnormal triggering event is generated by at least one physical parameter when the pump control system is operated.

2. The pump control system of claim 1, further comprising:
   a first temperature sensor configured to sense an ambient temperature surrounding the driving controller;
   a second temperature sensor configured to sense a temperature of a heat sink, wherein the heat sink is disposed in at least one of the motor and the power module; and
   a third temperature sensor configured to sense a temperature of the power module connected to the motor,
   wherein the abnormal triggering event is that at least one of the temperature of the second temperature sensor and the temperature of the third temperature sensor is greater than a corresponding upper limit value, and the driving controller controls the speed of the motor to be decreased in a multistage manner in response to the abnormal triggering event;
   when the temperature of the second temperature sensor and the temperature of the third temperature sensor are normal, the speed is increased; when at least one of the temperature of the second temperature sensor and the temperature of the third temperature sensor is not normal, the speed is decreased again;
   when the temperature of the second temperature sensor and the temperature of the third temperature sensor are normal after the speed of the motor is decreased again, the speed is increased in a multistage manner; when at least one of the temperature of the second temperature sensor and the temperature of the third temperature sensor is not normal, the speed is decreased again;
   when the temperature of the second temperature sensor and the temperature of the third temperature sensor are normal after the speed is increased, the speed is increased again; when at least one of the temperature of the second temperature sensor and the temperature of the third temperature sensor is not normal, the speed is decreased again;
   the above operations last shorter than a predetermined time, the driving controller controls the motor to be operated at a highest one of speeds that can be operated normally, and the speeds that can be operated normally are equal to or lower than an original speed which is set before the above operations;
   after duration of the above operations reaches the predetermined time and at least one of the temperature of the second temperature sensor and the temperature of the third temperature sensor is not normal, the driving controller controls the motor to stop operating.

3. The pump control system of claim 2, wherein the upper limit values vary with the temperature of the first temperature sensor.

4. The pump control system of claim 1, further comprising:
   a first temperature sensor configured to sense an ambient temperature surrounding the driving controller;

a second temperature sensor configured to sense a temperature of a heat sink, wherein the heat sink is disposed in at least one of the motor and the power module; and a third temperature sensor configured to sense a temperature of the power module connected to the motor, wherein the abnormal triggering event is that at least one of a positive or negative slope of the temperature of the second temperature sensor and a positive or negative slope of the temperature of the third temperature sensor is greater than a corresponding upper limit value, and the driving controller, in response to the abnormal triggering event, predicts the motor to be abnormal and controls the speed of the motor to be decreased in a multistage manner.

5. The pump control system of claim 4, wherein the corresponding upper limit value varies with the temperature of the first temperature sensor.

6. The pump control system of claim 1, further comprising a current detector, the current detector configured to detect a current of the motor, wherein the abnormal triggering event is that the current is greater than a current upper limit value and the speed of the motor is greater than a speed upper limit, and in response to the abnormal triggering event, the driving controller controls the speed of the motor to be decreased in a multistage manner; when it is determined, according to the current and the speed, that the motor is still not normal after the speed is decreased for one stage, the speed is decreased again; when the motor is normal, the speed is increased;

when it is determined, according to the current and the speed, that the motor is normal after the speed is decreased again, the speed is increased in a multistage manner; when the motor is not normal, the speed is decreased again;

when it is determined, according to the current and the speed, that the motor is not normal after the speed is increased, the speed is decreased; when the motor is normal, the speed is increased again;

the above operations last shorter than a predetermined time, the driving controller controls the motor to be operated at a highest one of speeds that can be operated normally, and the speeds that can be operated normally are equal to or lower than an original speed which is set before the above operations;

after duration of the above operations reaches the predetermined time and the current and the speed are not normal, the driving controller controls the motor to stop operating;

wherein in the above operations, the speed is determined according to the set speed at that time.

7. The pump control system of claim 1, further comprising a current detector, the current detector configured to detect a current of the motor, wherein the abnormal triggering event is that the current is greater than a current upper limit value and the speed of the motor is lower than a speed lower limit value, and in response to the abnormal triggering event, the driving controller controls the speed of the motor to be changed arbitrarily for several times in a period of time first, and then to be set at a speed lower than an originally set speed;

when it is determined, according to the current and the speed, that the motor is still not normal, the motor is controlled to be overloaded and operated for a period of time and then the speed is set at a speed lower than the originally set speed; when it is determined that the motor is normal, the speed remains for a period of time and then the speed is controlled to be increased in a multistage manner;

when it is determined, according to the current and the speed, that the motor is still not normal after the motor is controlled to be overloaded and operated for the period of time and then the speed is set at the speed lower than the originally set speed, the speed of the motor is controlled to be changed arbitrarily for several times in a period of time first, and then to be set at a speed lower than the originally set speed; when the motor is normal, the speed remains for a period of time and then the speed is controlled to be increased in a multistage manner;

when the motor is not normal after the driving controller controls the speed of the motor to be increased in a multistage manner, the driving controller controls the speed of the motor to be changed arbitrarily for several times in a period of time first, and then to be set at a speed lower than the originally set speed;

when the motor is still not normal after the driving controller controls the speed of the motor to be changed arbitrarily for the period of time first and then to be set at the speed lower than the originally set speed, the motor is controlled to be overloaded and operated for a period of time and then the speed is set at a speed lower than the originally set speed; when the motor is normal, the speed remains for a period of time and then the speed is controlled to be increased in a multistage manner;

when the motor is still not normal after the driving controller controls the speed of the motor to be increased in a multistage manner, the motor is controlled to be overloaded and operated for a period of time and then the speed is set at a speed lower than the originally set speed;

the above operations last shorter than a predetermined time, the driving controller controls the motor to be operated at a highest one of speeds that can be operated normally and the speeds that can be operated normally are equal to or lower than an original speed which is set before the above operations;

after duration of the above operations reaches the predetermined time and the current and the speed are not normal, the driving controller controls the motor to stop operating;

wherein in the above operations, the speed is determined according to the set speed at that time.

8. The pump control system of claim 7, wherein after the motor driving controller controls the speed of the motor to be changed arbitrarily for several times or controls the motor to be overloaded and operated and the speed is set at a first speed lower than the originally set speed, it is determined, according to the shifting average value and the speed, whether the motor is normal;

when it is determined that the motor is not normal, the speed is set to a second speed lower than the originally set speed after the motor driving controller controls the motor to be overloaded and operated or controls the speed of the motor to be changed arbitrarily for several times in the following steps, and the second speed is lower than the first speed.

9. The pump control system of claim 1, further comprising a vibration sensor, wherein the abnormal triggering event is a vibration variation of the pump control system sensed by the vibration sensor, and the driving controller controls the speed of the motor to be decreased in a multistage manner in response to the abnormal triggering event;

when the vibration variation is normal, the speed is increased; when the vibration variation is not normal, the speed is decreased again;

when the vibration variation is normal after the speed is decreased again, the speed is increased in a multistage manner; when the vibration variation is not normal, the speed is decreased again;

when the vibration variation is normal after the speed is increased, the speed is increased again; when the vibration variation is not normal, the speed is decreased again, the above operations last shorter than a predetermined time, the driving controller controls the motor to be operated at a highest one of speeds that can be operated normally, and the speeds that can be operated normally are equal to or lower than an original speed which is set before the above operations;

after duration of the above operations reaches the predetermined time reaches and the vibration variation is not normal, the driving controller controls the motor to stop operating.

10. An abnormal processing and recovering method of a pump control system, the pump control system comprising a pump, a motor mechanically connected to the pump, and a driving controller electrically coupled to the motor, and the abnormal processing and recovering method of the pump control system comprising:

driving the pump to operate by the motor; and controlling, by the driving controller, a speed of the motor to be changed in a multistage manner in response to an abnormal triggering event, so as to recover the pump control system to an originally set stable state, wherein the abnormal triggering event is generated by at least one physical parameter when the pump control system is operated.

11. The abnormal processing and recovering method of the pump control system of claim 10, the pump control system further comprising a first temperature sensor configured to sense an ambient temperature surrounding the driving controller; a second temperature sensor configured to sense a temperature of a heat sink, wherein the heat sink is disposed in at least one of the motor and the power module; and a third temperature sensor configured to sense a temperature of the power module connected to the motor, wherein the abnormal triggering event is that at least one of the temperature of the second temperature sensor and the temperature of the third temperature sensor is greater than a corresponding upper limit value, and the controlling, by the driving controller, the speed of the motor to be changed in a multistage manner in response to the abnormal triggering event comprises:

controlling, by the driving controller, the speed of the motor to be decreased in a multistage manner in response to the abnormal triggering event; when the temperature of the second temperature sensor and the temperature of the third temperature sensor are normal, the speed is increased; when at least one of the temperature of the second temperature sensor and the temperature of the third temperature sensor is not normal, the speed is decreased again;

when the temperature of the second temperature sensor and the temperature of the third temperature sensor are normal after the speed of the motor is decreased again, the speed is increased in a multistage manner; when at least one of the temperature of the second temperature sensor and the temperature of the third temperature sensor is not normal, the speed is decreased again;

when the temperature of the second temperature sensor and the temperature of the third temperature sensor are normal after the speed is increased, the speed is increased again; when at least one of the temperature of the second temperature sensor and the temperature of the third temperature sensor is not normal, the speed is decreased again;

the above operations last shorter than a predetermined time, the driving controller controls the motor to be operated at a highest one of speeds that can be operated normally, and the speeds that can be operated normally are equal to or lower than an original speed which is set before the above operations;

after duration of the above operations reaches the predetermined time and at least one of the temperature of the second temperature sensor and the temperature of the third temperature sensor is not normal, the driving controller controls the motor 12 to stop operating.

12. The abnormal processing and recovering method of the pump control system of claim 11, wherein the upper limit values vary with the temperature of the first temperature sensor.

13. The abnormal processing and recovering method of the pump control system of claim 10, the pump control system further comprising a first temperature sensor configured to sense an ambient temperature surrounding the driving controller; a second temperature sensor configured to sense a temperature of a heat sink, wherein the heat sink is disposed in at least one of the motor and the power module; and a third temperature sensor configured to sense a temperature of the power module connected to the motor, wherein the abnormal triggering event is that at least one of a positive or negative slope of the temperature of the second temperature sensor and a positive or negative slope of the temperature of the third temperature sensor is greater than a corresponding upper limit value, and the controlling, by the driving controller, the speed of the motor to be changed in a multistage manner in response to the abnormal triggering event comprises:

predicting the motor to be abnormal and controlling the speed of the motor to be decreased in a multistage manner by the driving controller.

14. The abnormal processing and recovering method of the pump control system of claim 13, wherein the corresponding upper limit value varies with the temperature of the first temperature sensor.

15. The abnormal processing and recovering method of the pump control system of claim 10, the pump control system further comprising a current detector, the current detector configured to detect a current of the motor, wherein the abnormal triggering event is that the current is greater than a current upper limit value and the speed of the motor is greater than a speed upper limit value, and the controlling, by the driving controller, the speed of the motor to be changed in a multistage manner in response to the abnormal triggering event comprises:

controlling, by the driving controller, the speed of the motor to be decreased in a multistage manner in response to the abnormal triggering event; when it is determined, according to the current and the speed, that the motor is still not normal after the speed is decreased for one stage, the speed is decreased again; when the motor is normal, the speed is increased;

when it is determined, according to the current and the speed, that the motor is normal after the speed is decreased again, the speed is increased in a multistage manner; when the motor is not normal, the speed is decreased again;

when it is determined, according to the current and the speed, that the motor is not normal after the speed is increased, the speed is decreased; when the motor is normal, the speed is increased again;

the above operations last shorter than a predetermined time, the driving controller controls the motor to be operated at a highest one of speeds that can be operated normally, and the speeds that can be operated normally are equal to or lower than an original speed which is set before the above operations;

after duration of the above operations reaches the predetermined time and the current and the speed are not normal, the driving controller controls the motor to stop operating;

wherein in the above operations, the speed is determined according to the set speed at that time.

16. The abnormal processing and recovering method of the pump control system of claim 10, the pump control system further comprising a current detector, the current detector configured to detect a current of the motor, wherein the abnormal triggering event is that the current is greater than a current upper limit value and the speed of the motor is lower than a speed lower limit value, and the controlling, by the driving controller, the speed of the motor to be changed in a multistage manner in response to the abnormal triggering event comprises:

controlling, by the driving controller, the speed of the motor to be changed arbitrarily for several times in a period of time first, and then to be set at a speed lower than an originally set speed in response to the abnormal triggering event;

when it is determined, according to the current and the speed, that the motor is still not normal, the motor is controlled to be overloaded and operated for a period of time and then the speed is set at a speed lower than the originally set speed; when it is determined that the motor is normal, the speed remains for a period of time and then the speed is controlled to be increased in a multistage manner;

when it is determined, according to the current and the speed, that the motor is still not normal after the motor is controlled to be overloaded and operated for the period of time and then the speed is set at the speed lower than the originally set speed, the speed of the motor is controlled to be changed arbitrarily for several times in a period of time first, and then to be set at a speed lower than the originally set speed; when the motor is normal, the speed remains for a period of time and then the speed is controlled to be increased in a multistage manner;

when the motor is not normal after the driving controller controls the speed of the motor to be increased in a multistage manner, the driving controller controls the speed of the motor to be changed arbitrarily for several times in a period of time first, and then to be set at a speed lower than the originally set speed;

when the motor is still not normal after the driving controller controls the speed of the motor to be changed arbitrarily for several times in a period of time first and then to be set at the speed lower than the originally set speed, the motor is controlled to be overloaded and operated for a period of time and then the speed is set at a speed lower than the originally set speed; when the motor is normal, the speed remains for a period of time and then the speed is controlled to be increased in a multistage manner;

when the motor is still not normal after the driving controller controls the speed of the motor to be increased in a multistage manner, the motor is controlled to be overloaded and operated for a period of time and then the speed is set at a speed lower than the originally set speed;

the above operations last shorter than a predetermined time, the driving controller controls the motor to be operated at a highest one of speeds that can be operated normally and the speeds that can be operated normally are equal to or lower than an original speed which is set before the above operations;

after duration of the above operations reaches the predetermined time and the current and the speed are not normal, the driving controller controls the motor to stop operating;

wherein in the above operations, the speed is determined according to the set speed at that time.

17. The abnormal processing and recovering method of the pump control system of claim 16, wherein after the motor driving controller controls the speed of the motor to be changed arbitrarily for several times or controls the motor to be overloaded and operated and the speed is set at a first speed lower than the originally set speed, it is determined, according to the shifting average value and the speed, whether the motor is normal;

when it is determined that the motor is not normal, the speed is set to a second speed lower than the originally set speed after the motor driving controller controls the motor to be overloaded and operated or controls the speed of the motor to be changed arbitrarily for several times in the following steps, and the second speed is lower than the first speed.

18. The abnormal processing and recovering method of the pump control system of claim 10, the pump control system further comprising a vibration sensor, wherein the abnormal triggering event is a vibration variation of the pump control system sensed by the vibration sensor, and the controlling, by the driving controller, the speed of the motor to be changed in a multistage manner in response to the abnormal triggering event comprises;

controlling, by the driving controller, the speed of the motor to be decreased in a multistage manner in response to the abnormal triggering event;

when the vibration variation is normal, the speed is increased; when the vibration variation is not normal, the speed is decreased again;

when the vibration variation is normal after the speed is decreased again, the speed is increased in a multistage manner; when the vibration variation is not normal, the speed is decreased again;

when the vibration variation is normal after the speed is increased, the speed is increased again; when the vibration variation is not normal, the speed is decreased again, the above operations last shorter than a predetermined time, the driving controller controls the motor to be operated at a highest one of speeds that can be operated normally, and the speeds that can be operated normally are equal to or lower than an original speed which is set before the above operations;

after duration of the above operations reaches the predetermined time and the vibration variation is not normal, the driving controller controls the motor to stop operating.

* * * * *